US012798952B2

(12) United States Patent
Honda et al.

(10) Patent No.: US 12,798,952 B2
(45) Date of Patent: Nov. 17, 2026

(54) BUFFER GATE, PUMP CARRYING-IN METHOD, AND PUMP PULLING-UP METHOD

(71) Applicant: EBARA CORPORATION, Tokyo (JP)

(72) Inventors: Shuichiro Honda, Tokyo (JP); Tetsuji Kasatani, Tokyo (JP); Hayato Ikeda, Tokyo (JP); Mitsutaka Iwami, Tokyo (JP); Kei Wataji, Tokyo (JP); Hyuga Kikuchi, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 257 days.

(21) Appl. No.: 18/683,337

(22) PCT Filed: Aug. 9, 2022

(86) PCT No.: PCT/JP2022/030388
§ 371 (c)(1),
(2) Date: Feb. 13, 2024

(87) PCT Pub. No.: WO2023/022063
PCT Pub. Date: Feb. 23, 2023

(65) Prior Publication Data

US 2026/0132013 A1 May 14, 2026

(30) Foreign Application Priority Data

Aug. 17, 2021 (JP) ................................ 2021-132903

(51) Int. Cl.
*F17C 9/00* (2006.01)
*B67D 7/02* (2010.01)
(Continued)

(52) U.S. Cl.
CPC ........... *B67D 7/0294* (2013.01); *F04D 13/00* (2013.01); *F04D 29/608* (2013.01); *F17C 9/00* (2013.01); *F17C 13/00* (2013.01)

(58) Field of Classification Search
CPC ...... F17C 2227/0135; F17C 2227/0718; F17C 2227/0142; F17C 2227/044;
(Continued)

(56) References Cited

U.S. PATENT DOCUMENTS

| | | | |
|---|---|---|---|
| 3,696,975 | A | 10/1972 | Bryant et al. |
| 4,174,791 | A | 11/1979 | Auchter et al. |

(Continued)

FOREIGN PATENT DOCUMENTS

| | | | |
|---|---|---|---|
| CN | 105485513 | A | 4/2016 |
| CN | 111486335 | A | 8/2020 |

(Continued)

OTHER PUBLICATIONS

Supplemental European Search Report for 22 85 8384 dated Aug. 27, 2025.

(Continued)

*Primary Examiner* — Kelsey E Cary
(74) *Attorney, Agent, or Firm* — Chrisman Gallo Tochtrop LLC

(57) ABSTRACT

The present application relates to a buffer gate for use in isolating inside and outside of a pump column when a submersible pump for pressurizing liquefied gas, such as liquid hydrogen, is carried into the pump column and when the submersible pump is pulled up from the pump column. The buffer gate is configured to isolate the inside and the outside of the pump column in which the submersible pump is disposed, the submersible pump being for delivering the liquefied gas. The buffer gate includes a buffer box having a buffer chamber therein, a first partition wall configured to close an upper opening of the buffer box, a second partition wall configured to close an upper opening of the pump
(Continued)

column, and a purge-gas inlet port communicating with the buffer chamber. The buffer box is fixed to an upper end of the pump column.

26 Claims, 28 Drawing Sheets

(51) Int. Cl.

| | |
|---|---|
| ***F04D 13/00*** | (2006.01) |
| ***F04D 29/60*** | (2006.01) |
| ***F17C 13/00*** | (2006.01) |

(58) Field of Classification Search

CPC ...... F17C 2201/0104; F17C 2201/0109; F17C 2201/0119; F17C 2201/032; F17C 2201/052; F17C 2221/012; F17C 2223/0153; F17C 2223/0161; F17C 2223/033; F17C 2223/046; F17C 2250/0439; F17C 2250/0491; F04D 7/00; F04D 1/0443; F04D 53/04; F04D 29/608; F04D 7/02; F05D 2230/72; F05D 2260/02; B67D 7/0294

See application file for complete search history.

(56) References Cited

U.S. PATENT DOCUMENTS

| | | | | |
|---|---|---|---|---|
| 4,435,132 | A | 3/1984 | Haesloop et al. | |
| 12,429,058 | B2 * | 9/2025 | Honda | F04B 15/08 |
| 2005/0123425 | A1 | 6/2005 | Smith, III et al. | |
| 2024/0344664 | A1 * | 10/2024 | Honda | F04D 13/086 |
| 2024/0353068 | A1 * | 10/2024 | Honda | F04D 29/608 |
| 2024/0360832 | A1 * | 10/2024 | Honda | F04D 7/02 |
| 2025/0060075 | A1 * | 2/2025 | Kasatani | F17C 9/00 |

FOREIGN PATENT DOCUMENTS

| | | | |
|---|---|---|---|
| CN | 111594413 | A | 8/2020 |
| DE | 1 957 984 | A1 | 6/1970 |
| GB | 1 285 902 | A | 8/1972 |
| GB | 2 085 078 | A | 4/1982 |
| JP | S57-137684 | A | 8/1982 |
| JP | H05-071600 | U | 9/1993 |
| JP | H09-256985 | A | 9/1997 |
| JP | 3197645 | B2 | 8/2001 |
| JP | 3198248 | B2 | 8/2001 |
| JP | 3472379 | B2 | 12/2003 |
| JP | 2005-239183 | A | 9/2005 |
| JP | 2007-064065 | A | 3/2007 |

OTHER PUBLICATIONS

International Search Report issued in Patent Application No. PCT/JP2022/030388 dated Sep. 27, 2022.

* cited by examiner

STEP 1－10a STEP 1－10b

STEP 2-6'

STEP 2－12’

STEP 2－12a'

STEP 2－12b'

STEP 2-19

*FIG. 26*

| PURGE-GAS INFLOW RATE [%] | | | | RELATIVE RATE OF INCREASE IN OXYGEN CONCENTRATION |
|---|---|---|---|---|
| TOTAL AMOUNT OF SUPPLY | EXPERIMENT NO. | LOWER CHAMBER | UPPER CHAMBER | |
| A | No.1 | 64 | 33 | 1 |
| | No.2 | 33 | 64 | 1.4 |
| B | No.3 | 77 | 23 | 1 |
| | No.4 | 23 | 77 | 1.3 |
| C | No.5 | 62.5 | 37.5 | 1 |
| | No.6 | 37.5 | 62.5 | 1.3 |

A＞B＞C

*FIG. 27*

| | STEP | | | | | | | | | |
|---|---|---|---|---|---|---|---|---|---|---|
| INFLOW POSITION OF PURGE GAS | 1−9 | | 1−10 | | 1−15 | | 2−6 | | 2−12 | |
| PURGE-GAS INLET PORT 81 | ● | − | ● | − | ● | − | ● | − | ● | − |
| PURGE-GAS INLET PORT 20 | ● | − | ● | − | ● | − | ● | − | ● | − |
| PURGE-GAS INTRODUCTION PORT 8 | ● | ● | ● | ● | ● | ● | ● | ● | ● | ● |
| PURGE-GAS OUTLET PORT 27 | − | − | − | − | − | − | − | − | − | − |
| REPLACEMENT SPEED OF GAS | ○ | ◎ | ○ | ◎ | ○ | ◎ | ○ | ◎ | ○ | ◎ |
| AMOUNT OF PURGE GAS USED | △ | ◎ | △ | ◎ | △ | ◎ | △ | ◎ | △ | ◎ |
| OPERABILITY OF VALVE | △ | ◎ | △ | ◎ | △ | ◎ | △ | ◎ | △ | ◎ |
| EFFICIENCY OF DRYING-UP OPERATION | ◎ | ○ | | | ◎ | ○ | | | | |
| OPERATIONAL SAFETY | ○ | ◎ | ○ | ◎ | ○ | ◎ | ○ | ◎ | ○ | ◎ |

● USE − NO USE
○ GOOD ◎ VERY GOOD △ NOT GOOD

BUFFER GATE, PUMP CARRYING-IN METHOD, AND PUMP PULLING-UP METHOD

TECHNICAL FIELD

The present invention relates to a buffer gate for use in isolating inside and outside of a pump column when a submersible pump for pressurizing liquefied gas, such as liquefied ammonia, liquefied natural gas (LNG), or liquid hydrogen, is carried into the pump column and when the submersible pump is pulled up from the pump column. Further, the present invention relates to a method of carrying the submersible pump into the pump column and a method of pulling up the submersible pump from the pump column using such a buffer gate.

BACKGROUND ART

Natural gas is widely used for thermal power generation and used as a raw material for chemicals. Furthermore, ammonia and hydrogen are expected to be energies that do not generate carbon dioxide that causes global warming. Applications of hydrogen as an energy include fuel cell and turbine power generation. Natural gas, ammonia, and hydrogen are in a gaseous state at normal temperature, and therefore natural gas, ammonia, and hydrogen are cooled and liquefied for their storage and transportation. Liquefied gas, such as liquefied natural gas (LNG), liquefied ammonia, and liquefied hydrogen, is temporarily stored in a liquefied-gas storage tank and then delivered to a power plant, factory, or the like by a pump.

FIG. 28 is a schematic diagram showing a conventional example of a liquefied-gas storage tank in which liquefied gas is stored and a pump for pumping up the liquefied gas. A pump 500 is installed in a vertical pump column 505 disposed in a liquefied-gas storage tank 501. The inside of the pump column 505 is filled with the liquefied gas, and the entire pump 500 is immersed in the liquefied gas. The pump 500 is thus a submersible pump that can operate in the liquefied gas. When the pump 500 is operated, the liquefied gas in the liquefied-gas storage tank 501 is sucked into the pump column 505, ascends in the pump column 505, and is discharged from the pump column 505 through a liquefied-gas discharge port 509.

CITATION LIST

Patent Literature

Patent document 1: Japanese U.S. Pat. No. 3,197,645

Patent document 2: Japanese U.S. Pat. No. 3,198,248

Patent document 3: Japanese U.S. Pat. No. 3,472,379

SUMMARY OF INVENTION

Technical Problem

The pump 500 is a machine that contains consumables, and therefore the pump 500 requires regular maintenance. When the pump 500 is installed in the pump column 505 for the first time and when the pump 500 is returned to the pump column 505 after the maintenance, it is necessary to prevent air, entrained by the pump 500, from entering the pump column 505. If air enters the pump column 505 together with the pump 500, moisture in the air will be cooled and solidified by the ultra-low temperature liquefied gas, and as a result, the rotation of the pump 500 will be hindered. In particular, when the liquefied gas is liquid hydrogen, nitrogen and oxygen in the air are liquefied or solidified and may be mixed into the liquefied gas. The solidification of nitrogen and oxygen can damage equipment. Moreover, mixture of the liquefied oxygen and the liquid hydrogen can cause an explosion.

When the pump 500 is removed from the pump column 505 for the purpose of maintenance, etc., it is also necessary to prevent ambient air from entering the pump column 505. Specifically, the pump 500 that has been in contact with the liquefied gas has an extremely low temperature, and when the air contacts such low-temperature pump 500, the moisture contained in the air is liquefied or solidified on the surfaces of the pump 500, and may fall into the pump column 505 and may be mixed with the liquefied gas. Especially when the liquefied gas is liquid hydrogen, the following problem may occur. The temperature of liquid hydrogen is −253° C. or less, and therefore the pump 500 just removed from the pump column 505 also has an ultra-low temperature equivalent to that of the liquid hydrogen. When the air comes into contact with such ultra-low temperature pump 500, not only the nitrogen in the air but also the oxygen is liquefied. If the liquefied oxygen drops into the liquefied-gas storage tank 501 and mixes with the liquid hydrogen, an explosion may occur, which is extremely dangerous.

Therefore, the present invention provides a buffer gate capable of isolating inside and outside of a pump column when a submersible pump is carried into the pump column and when the submersible pump is pulled up from the pump column. Further, the present invention provides a method of carrying the submersible pump into the pump column and a method of pulling up the submersible pump from the pump column using such a buffer gate.

Solution to Problem

In an embodiment, there is provided a buffer gate for isolating inside and outside of a pump column in which a submersible pump is disposed, the submersible pump being for delivering liquefied gas, said buffer gate comprising: a buffer box having a buffer chamber therein, the buffer box being fixed to an upper end of the pump column; a first partition wall configured to close an upper opening of the buffer box; a second partition wall configured to close an upper opening of the pump column; and a purge-gas inlet port communicating with the buffer chamber.

In an embodiment, a vertical length of the buffer chamber is smaller than a vertical length of the submersible pump.

In an embodiment, the buffer gate further comprises a leak detector configured to detect liquefied gas leaked from the pump column into the buffer chamber.

In an embodiment, the buffer gate further comprises a purge-gas outlet port communicating with the buffer chamber, the purge-gas outlet port being coupled to a gas treatment device.

In an embodiment, the buffer gate further comprises an electrical terminal coupled to a power cable for supplying electric power to the submersible pump.

In an embodiment, there is provided a method of carrying a submersible pump into a pump column, the submersible pump being for delivering liquefied gas, said method comprising: moving the submersible pump into a purge container with an upper lid of the purge container opened, the purge container being disposed on a buffer gate; filling an interior space of the purge container accommodating the submersible pump with purge gas with an upper opening of the pump column closed by a first gate valve, an upper opening of the purge container closed by the upper lid, and a lower opening of the purge container closed by a second gate valve; and moving the submersible pump from the purge container into the pump column via the buffer gate with the upper lid closed, and the first gate valve and the second gate valve opened.

In an embodiment, while the submersible pump is moved from the purge container into the pump column via the buffer gate, purge gas is continuously supplied into the purge container, a buffer chamber of the buffer gate, and the pump column.

In an embodiment, a pressure of the purge gas supplied into the buffer chamber is higher than a pressure of the purge gas supplied into the purge container.

In an embodiment, a pressure of the purge gas supplied into the pump column is higher than a pressure of the purge gas supplied into the buffer chamber.

In an embodiment, while the submersible pump is moved from the purge container into the pump column via the buffer gate, purge gas is supplied into the purge container, a buffer chamber of the buffer gate, and the pump column in an order of the purge container, the buffer chamber, and the pump column.

In an embodiment, while the submersible pump is moved from the purge container into the pump column via the buffer gate, the purge gas is supplied into the pump column to cause flow of the purge gas from the pump column into an interior space of the purge container via a buffer chamber of the buffer gate.

In an embodiment, the method further comprises supplying purge gas to an interior of the submersible pump before moving the submersible pump into the purge container or after moving the submersible pump into the purge container.

In an embodiment, the method further comprises lowering the submersible pump within the pump column with the upper lid, the first gate valve, and the second gate valve closed after moving the submersible pump from the purge container into the pump column via the buffer gate.

In an embodiment, the liquefied gas comprises liquid hydrogen and the purge gas includes at least helium gas.

In an embodiment, the liquefied gas comprises liquid hydrogen and the purge gas includes hydrogen gas.

In an embodiment, the liquefied gas comprises liquefied ammonia and the purge gas includes ammonia gas.

In an embodiment, there is provided a method of pulling up a submersible pump from a pump column, the submersible pump being for delivering liquefied gas, said method comprising: moving the submersible pump from the pump column into a purge container via a buffer gate with an upper opening of the purge container closed by an upper lid, the purge container being disposed on the buffer gate; filling an interior of the purge container accommodating the submersible pump with purge gas with an upper opening of the pump column closed by a first gate valve, the upper opening of the purge container closed by the upper lid, and a lower opening of the purge container closed by a second gate valve; and pulling up the submersible pump from the purge container with the upper lid opened, and the first gate valve and the second gate valve closed.

In an embodiment, while the submersible pump is moved from the pump column into the purge container via the buffer gate, purge gas is continuously supplied into the purge container, a buffer chamber of the buffer gate, and the pump column.

In an embodiment, a pressure of the purge gas supplied into the buffer chamber is higher than a pressure of the purge gas supplied into the purge container.

In an embodiment, a pressure of the purge gas supplied into the pump column is higher than a pressure of the purge gas supplied into the buffer chamber.

In an embodiment, while the submersible pump is moved from the pump column into the purge container via the buffer gate, purge gas is supplied into the pump column, a buffer chamber of the buffer gate, and the purge container in an order of the pump column, the buffer chamber, and the purge container.

In an embodiment, while the submersible pump is moved from the pump column into the purge container via the buffer gate, the purge gas is supplied into the pump column to cause flow of the purge gas from the pump column into an interior space of the purge container via a buffer chamber of the buffer gate.

In an embodiment, the method further comprises elevating the submersible pump within the pump column with the upper lid, the first gate valve, and the second gate valve closed before moving the submersible pump from the pump column into the purge container via the buffer gate.

In an embodiment, the liquefied gas comprises liquid hydrogen and the purge gas includes at least helium gas.

In an embodiment, the liquefied gas comprises liquid hydrogen and the purge gas includes hydrogen gas.

In an embodiment, the liquefied gas comprises liquefied ammonia and the purge gas includes ammonia gas.

Advantageous Effects of Invention

The buffer gate allows the submersible pump to be carried into the pump column and allows the submersible pump to be pulled up from the pump column, while isolating the inside and the outside of the pump column. Therefore, the buffer gate can prevent the air existing outside the pump column from entering the pump column. In particular, the combination of the buffer gate and the purge container can reliably prevent air and moisture from entering the pump column. Specifically, air and moisture entrained with the submersible pump are removed from the submersible pump by the purge gas, and as a result, the submersible pump is dried up or degassed (this operation will be hereinafter referred to as drying-up operation). Therefore, the air and the moisture are not entrained with the submersible pump, and entry of the air and the moisture into the pump column can be prevented. After this drying-up operation, the submersible pump can be quickly moved into the pump column via the buffer gate with the purge gas existing around the submersible pump.

In addition, the ultra-low temperature submersible pump can be warmed with the purge gas while being elevated from the pump column into the purge container via the buffer gate (this operation will be hereinafter referred to as hot-up operation). This hot-up operation is performed before the submersible pump contacts the ambient air, so that moisture in the air is not liquefied or solidified on the surfaces of the submersible pump. In particular, the present invention is effective when the liquefied gas is liquid hydrogen. Specifically, the submersible pump that has been immersed in liquid hydrogen has an ultra-low temperature equivalent to that of the liquid hydrogen when the submersible pump is pulled out of the pump column.

The boiling point of hydrogen (−253° C.) is lower than the boiling point of oxygen (−183° C.) and the boiling point of nitrogen (−196° C.). Therefore, when the air comes into contact with the submersible pump immediately after the submersible pump is pulled up from the pump column, not only nitrogen in the air but also oxygen is liquefied and may drop into the pump column. In this regard, according to the present invention, the submersible pump that has been immersed in the liquid hydrogen is quickly warmed by the purge gas before the submersible pump contacts the air. Further, even if a part of the oxygen or a part of nitrogen in the air is liquefied, the buffer gate can prevent the liquefied oxygen or the liquefied nitrogen from dropping into the pump column. As a result, safe removal of the submersible pump can be achieved.

BRIEF DESCRIPTION OF DRAWINGS

FIG. 26 is a table showing results of purge-gas inflow experiments;

FIG. 27 is a table showing relative evaluation that varies depending on inflow position of the purge gas.

DESCRIPTION OF EMBODIMENTS

Hereinafter, embodiments of the present invention will be described with reference to the drawings.

Figure 1:
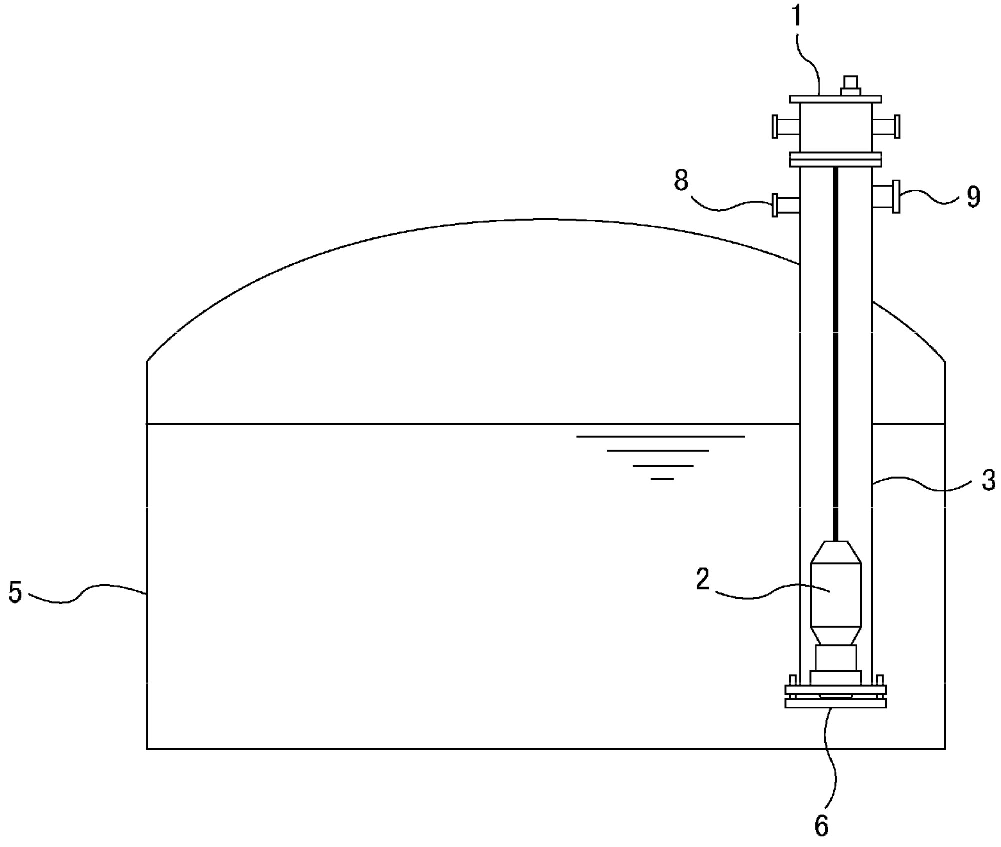
FIG. 1 is a diagram showing an embodiment of a pump system for delivering liquefied gas.

FIG. 1 is a diagram showing an embodiment of a pump system for delivering liquefied gas. Examples of the liquefied gas delivered by the pump system shown in FIG. 1 include liquefied ammonia, liquid hydrogen, liquid nitrogen, liquefied natural gas, liquefied ethylene gas, liquefied petroleum gas, etc.

As shown in FIG. 1, the pump system includes a submersible pump 2 configured to deliver the liquefied gas, a pump column 3 accommodating the submersible pump 2 therein, and a buffer gate 1 fixed to an upper end of the pump column 3. The pump column 3 is installed in a liquefied-gas storage tank 5 in which the liquefied gas is stored. The pump column 3 is a hollow container extending in a vertical direction, and its upper part protrudes upward from the liquefied-gas storage tank 5. A suction valve 6 is provided at a bottom of the pump column 3. The submersible pump 2 is installed on the bottom of the pump column 3. The structure of the suction valve 6 is not particularly limited. For example, the suction valve 6 may be of a type in which the suction valve 6 is opened by the weight of the submersible pump 2, or may be an actuator-driven valve (e.g., an electric valve). The pump column 3 further includes a purge-gas introduction port 8 and a discharge port 9.

The buffer gate 1 is a gate structure for isolating inside and outside of the pump column 3. During operation of the submersible pump 2, an upper opening of the pump column 3 is closed by the buffer gate 1. During operation of the submersible pump 2, the liquefied gas in the liquefied-gas storage tank 5 is introduced into the pump column 3 through the suction valve 6, and the inside of the pump column 3 is filled with the liquefied gas. During operation of the submersible pump 2, the entire submersible pump 2 is immersed in the liquefied gas. The submersible pump 2 is thus configured to be able to operate in the liquefied gas. The liquefied gas pressurized by the submersible pump 2 is delivered to the outside through the discharge port 9.

Figure 2:
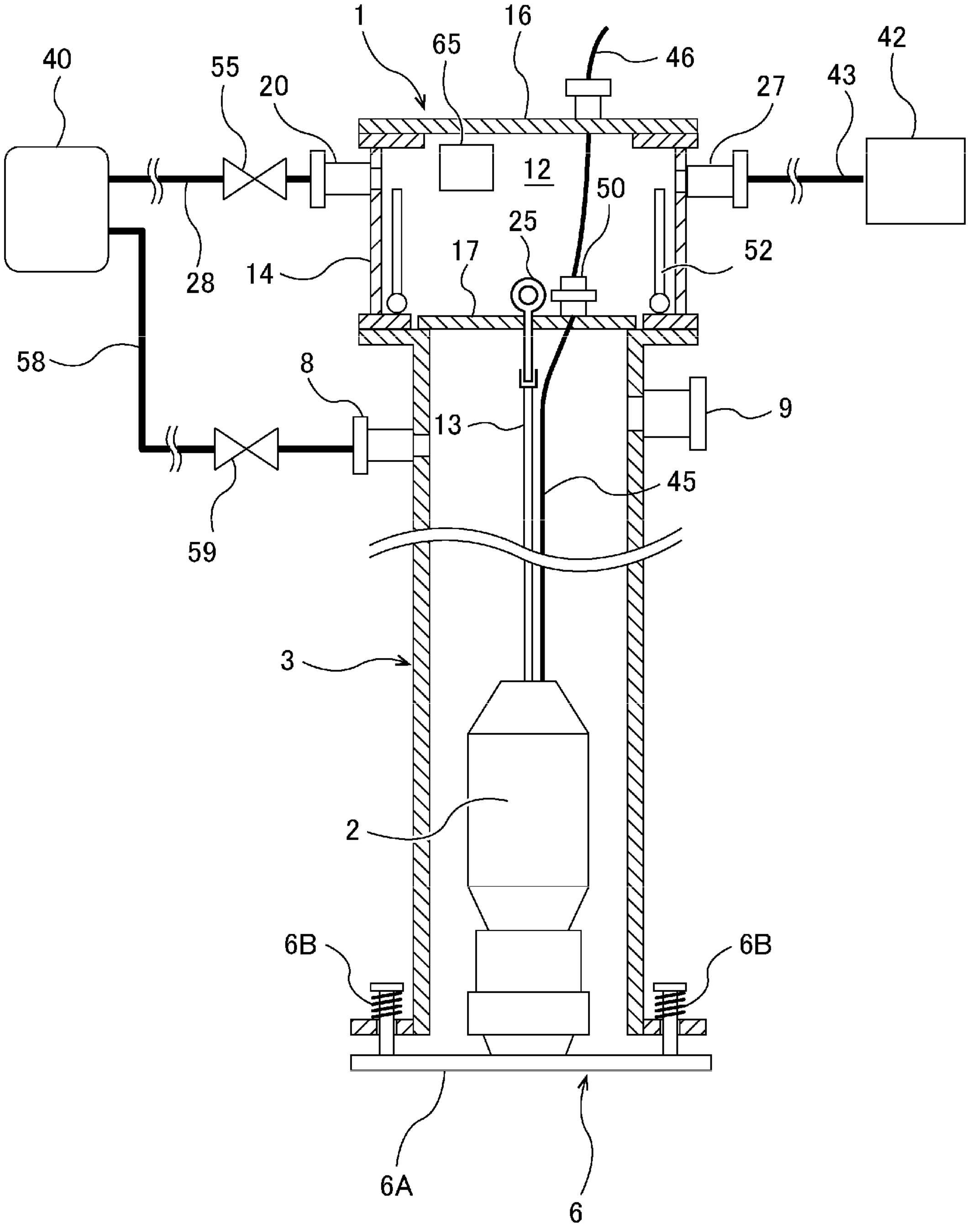
FIG. 2 is an enlarged cross-sectional view of a buffer gate and a pump column.

FIG. 2 is an enlarged cross-sectional view of the buffer gate 1 and the pump column 3. The buffer gate 1 includes a buffer box 14 having a buffer chamber 12 therein, a partition wall 16 configured to close an upper opening of the buffer box 14, a partition wall 17 configured to close the upper opening of the pump column 3, and a purge-gas inlet port 20 communicating with the buffer chamber 12. The buffer box 14 is fixed to the upper end of the pump column 3. The buffer chamber 12 is sealed by the upper partition wall 16 and the lower partition wall 17. The partition walls 16 and 17 are removably fixed to the buffer box 14 by not-shown fastening mechanisms (e.g., screws). A vertical length of the buffer chamber 12 is smaller than a vertical length of the submersible pump 2, and a width of the buffer chamber 12 is larger than a width of the submersible pump 2. Therefore, the submersible pump 2 can pass through the buffer chamber 12.

The buffer gate 1 has a movable rod 25 extending through the partition wall 17. The movable rod 25 is vertically movable relative to the partition wall 17. A suspension cable

13 is coupled to a lower end of the movable rod 25, and the submersible pump 2 is coupled to a lower end of the suspension cable 13.

The buffer gate 1 further includes a purge-gas outlet port 27 communicating with the buffer chamber 12. The purge-gas inlet port 20 is coupled to a purge-gas supply line 28, and the purge-gas supply line 28 is coupled to a purge-gas supply source 40. During operation of the submersible pump 2, purge gas, such as nitrogen gas or helium gas, is supplied into the buffer chamber 12 from the purge-gas supply source 40 through the purge-gas supply line 28 and the purge-gas inlet port 20, fills the buffer chamber 12, and is discharged through the purge-gas outlet port 27.

The purge gas to be used is gas composed of component (or element) having a boiling point lower than or equal to the boiling point of the liquefied gas to be pumped up by the submersible pump 2. This is because of preventing the purge gas from being liquefied when the purge gas contacts the liquefied gas or the ultra-low temperature submersible pump 2. Examples of purge gas include inert gas, such as nitrogen gas and helium gas. For example, when the liquefied gas to be pumped up by the submersible pump 2 is liquefied natural gas, nitrogen gas is used for the purge gas, since the nitrogen gas is composed of nitrogen having a boiling point (−196° C.) lower than the boiling point (−162° C.) of the liquefied natural gas. In another example, when the liquefied gas to be pumped up by the submersible pump 2 is liquid hydrogen, helium gas is used for the purge gas, since the helium gas is composed of helium having a boiling point (−269° C.) lower than the boiling point of hydrogen (−253° C.).

In one embodiment, as shown in FIG. 2, the purge-gas outlet port 27 may be coupled to a gas treatment device 42. Even if the liquefied gas leaks into the buffer chamber 12, gas (e.g., natural gas or hydrogen gas) vaporized from the liquefied gas will be discharged together with the purge gas from the buffer chamber 12 through the purge-gas outlet port 27, and will be delivered to the gas treatment device 42 through a purge-gas discharge line 43. The gas (e.g., natural gas or hydrogen gas) vaporized from the liquefied gas is treated by the gas treatment device 42 to be rendered harmless. Examples of the gas treatment device 42 include gas incinerator (flaring device), chemical gas treatment device, gas adsorption device, and the like. In one embodiment, the purge-gas outlet port 27 may be coupled to a gas dissipation device installed in a secure location.

A part of the purge gas may contain gas having the same component as that of the liquefied gas. If the purge-gas outlet port 27 is coupled to the gas treatment device 42, all of the purge gas may be gas having the same component as that of the liquefied gas. For example, if the liquefied gas is liquid hydrogen, a part or all of the purge gas may be hydrogen gas. In another example, if the liquefied gas is liquefied ammonia, a part or all of the purge gas may be ammonia gas. In one embodiment, the purge-gas supply source 40 may include a source of gas having the same component as that of the liquefied gas. For example, if the liquefied gas is liquid hydrogen, the purge-gas supply source 40 may include a hydrogen-gas supply source. In another example, if the liquefied gas is liquefied ammonia, the purge-gas supply source 40 may include an ammonia-gas supply source.

The buffer gate 1 further includes an electrical terminal 50 coupled to a power cable 45 for supplying electric power to the submersible pump 2. The electrical terminal 50 is disposed in the buffer chamber 12. In this embodiment, the electrical terminal 50 is disposed on the partition wall 17, while the electrical terminal 50 may be disposed on an inner surface of the buffer box 14. Further, in one embodiment, the electrical terminal 50 may be disposed outside the buffer chamber 12. For example, the electrical terminal 50 may be fixed to an outer surface of the partition wall 16.

The power cable 45 extends from the electrical terminal 50 to an electric motor of the submersible pump 2. The electric power is supplied from a power source (not shown) through an external power cable 46 to the electrical terminal 50, and is then supplied through the power cable 45 to the electric motor of the submersible pump 2.

The buffer gate 1 further includes a gate valve 52 disposed in the buffer chamber 12. This gate valve 52 is adjacent to the partition wall 17 and is located below the partition wall 16. More specifically, the gate valve 52 is located between the buffer box 14 and the pump column 3. The gate valve 52 is a double-door valve and is opened and closed by an actuator (not shown) or manually. In one embodiment, the gate valve 52 may be a single-door valve or another type of valve. The upper opening of the pump column 3 can be closed not only by the partition wall 17 but also by the gate valve 52.

A pressure regulating valve 55 is attached to the purge-gas supply line 28, and a pressure and a supply timing of the purge gas to be supplied into the buffer chamber 12 are regulated by the pressure regulating valve 55. A purge-gas supply line 58 is coupled to the purge-gas introduction port 8 of the pump column 3, and the purge-gas supply line 58 is coupled to the purge-gas supply source 40. A pressure regulating valve 59 is attached to the purge-gas supply line 58, and a pressure and a supply timing of the purge gas to be supplied into the pump column 3 are regulated by the pressure regulating valve 59.

The buffer gate 1 of this embodiment includes a leak detector 65 configured to detect the liquefied gas leaked from the pump column 3 into the buffer chamber 12. In the example shown in FIG. 2, the entire leak detector 65 is arranged in the buffer chamber 12. In one embodiment, a part of the leak detector 65 may be arranged in the buffer chamber 12 and the other part may be arranged outside the buffer chamber 12. Alternatively, the entire leak detector 65 may be arranged outside the buffer chamber 12, and the leak detector 65 may communicate with the buffer chamber 12. For example, the leak detector 65 may be coupled to the purge gas discharge line 43 coupled to the purge-gas outlet port 27. If the liquefied gas has leaked from the pump column 3 into the buffer chamber 12, the leak detector 65 can detect the leaked liquefied gas.

The suction valve 6 of the pump column 3 opens due to the weight of the submersible pump 2, so that the liquefied gas in the liquefied-gas storage tank 5 (see FIG. 1) flows into the pump column 3. The suction valve 6 has a valve element 6A covering a lower opening of the pump column 3, and a plurality of springs 6B that bias the valve element 6A upward. When the submersible pump 2 is not placed on the valve element 6A, the valve element 6A is pressed against the lower end of the pump column 3 by the plurality of springs 6B to thereby close the lower opening of the pump column 3. When the submersible pump 2 is placed on the valve element 6A, the weight of the submersible pump 2 causes the valve element 6A to move downward against the forces of the springs 6B to thereby open the suction valve 6. However, the suction valve 6 may be an actuator-driven valve (e.g., an electric valve).

Figure 3:
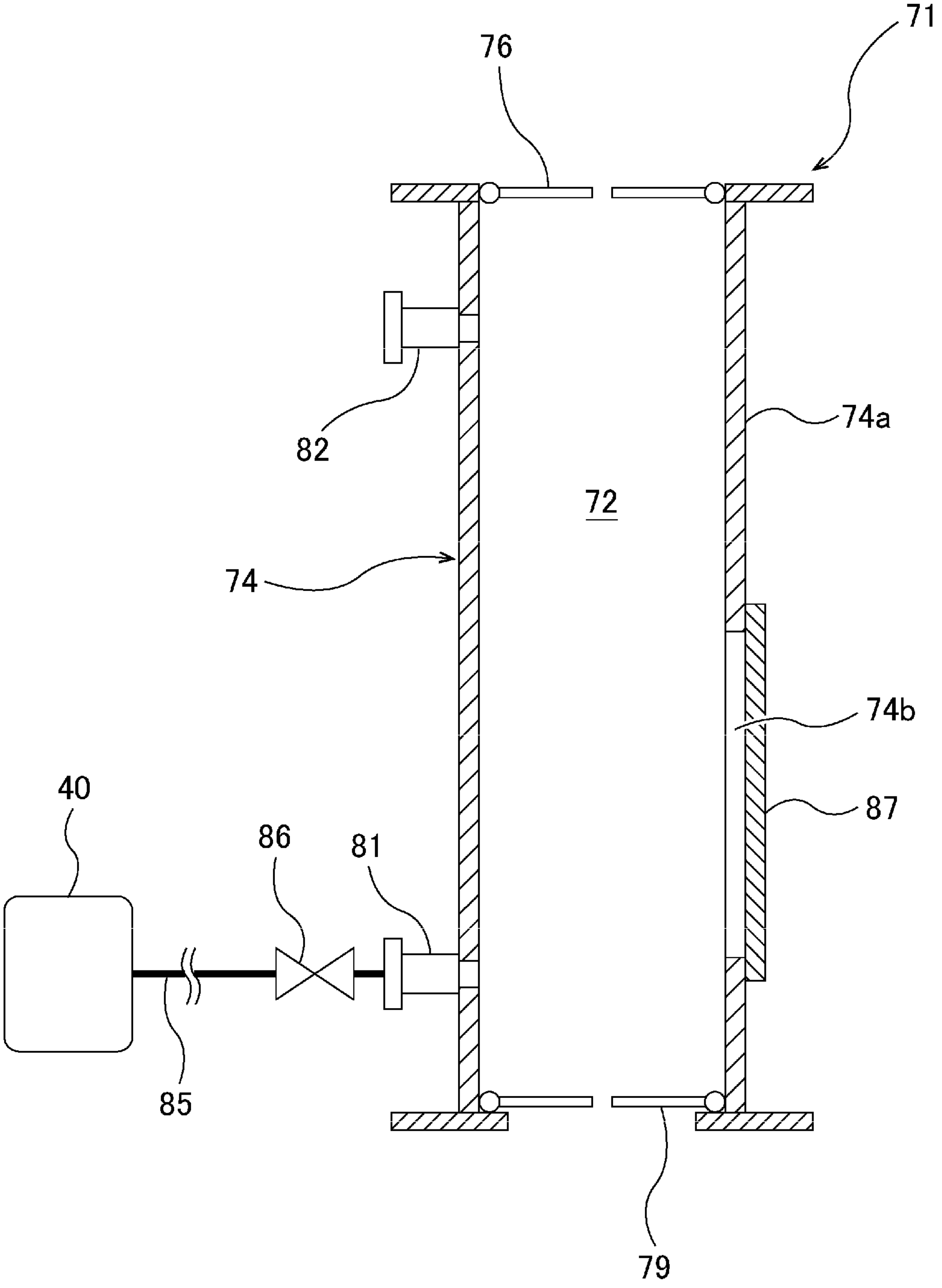
FIG. 3 is a cross-sectional view showing a purge container.

When the submersible pump 2 is carried into the pump column 3 and when the submersible pump 2 is pulled up from the pump column 3, a purge container 71, which will be described below, is used. FIG. 3 is a cross-sectional view showing the purge container 71. The purge container 71 is a device for exposing the submersible pump 2 to the purge gas. In this embodiment, the purge container 71 is detachably coupled to the buffer gate 1. In one embodiment, the purge container 71 may be fixed to an upper end of the buffer gate 1.

As shown in FIG. 3, the purge container 71 includes a container body 74 having an interior space 72 for accommodating the submersible pump 2 therein, an upper lid 76 covering an upper opening of the container body 74, a gate valve 79 covering a lower opening of the container body 74, and a purge-gas inlet port 81 and a purge-gas outlet port 82 communicating with the interior space 72 of the container body 74. The upper lid 76 and the gate valve 79 of this embodiment are of double-door type, while the upper lid 76 and the gate valve 79 may be of other type. The upper opening of the purge container 71 is closed by the upper lid 76, and the lower opening of the purge container 71 is closed by the gate valve 79.

A purge-gas supply line 85 extending from the purge-gas supply source 40 is coupled to the purge-gas inlet port 81. A pressure regulating valve 86 is attached to the purge-gas supply line 85, and a pressure and a supply timing of the purge gas to be supplied into the interior space 72 of the purge container 71 are regulated by the pressure regulating valve 86.

The container body 74 has a hollow structure. In this embodiment, the container body 74 has a rectangular horizontal cross section, while its shape is not particularly limited. The purge container 71 further includes a side lid 87 configured to close an opening **74*b* formed in a side wall 74*a* of the container body 74. The side lid 87 is removably fixed to the side wall 74*a* of the container body 74 by a not-shown fastening mechanism (e.g., a plurality of screws). When the side lid 87 is removed, a worker can access the interior space 72 of the purge container 71 through the opening 74*b***.

In one embodiment, the purge-gas supply source 40 is a nitrogen-gas supply source or a helium-gas supply source. Further, in one embodiment, the purge-gas supply source 40 may include a plurality of purge-gas supply sources of different types, e.g., a nitrogen-gas supply source and a helium-gas supply source. In this case, the plurality of purge-gas supply sources may be selectively coupled to the purge-gas supply line 85.

Helium gas is generally more expensive than nitrogen gas. Nitrogen has a larger atomic weight than that of helium, and therefore has a higher drying effect. Therefore, nitrogen gas may be used as the purge gas at first, and helium gas may be used as the purge gas in a final stage. For example, nitrogen gas may be supplied into the buffer chamber 12 and the purge container 71 to replace the air in the buffer chamber 12 and the interior space 72 of the purge container 71 with the nitrogen gas, and then helium gas may be supplied into the buffer chamber 12 and the purge container 71 to fill the buffer chamber 12 and the interior space 72 of the purge container 71 with the helium gas.

Next, an embodiment of an operation of carrying the submersible pump 2 into the pump column 3 will be described. In all steps described below, the purge gas is continuously supplied to at least one of the buffer chamber 12 and the pump column 3. A series of operations shown in FIGS. 4 to 12 includes a drying-up operation of drying the submersible pump 2 with the purge gas and an operation of putting the dried submersible pump 2 into the pump column 3.

Figure 4:
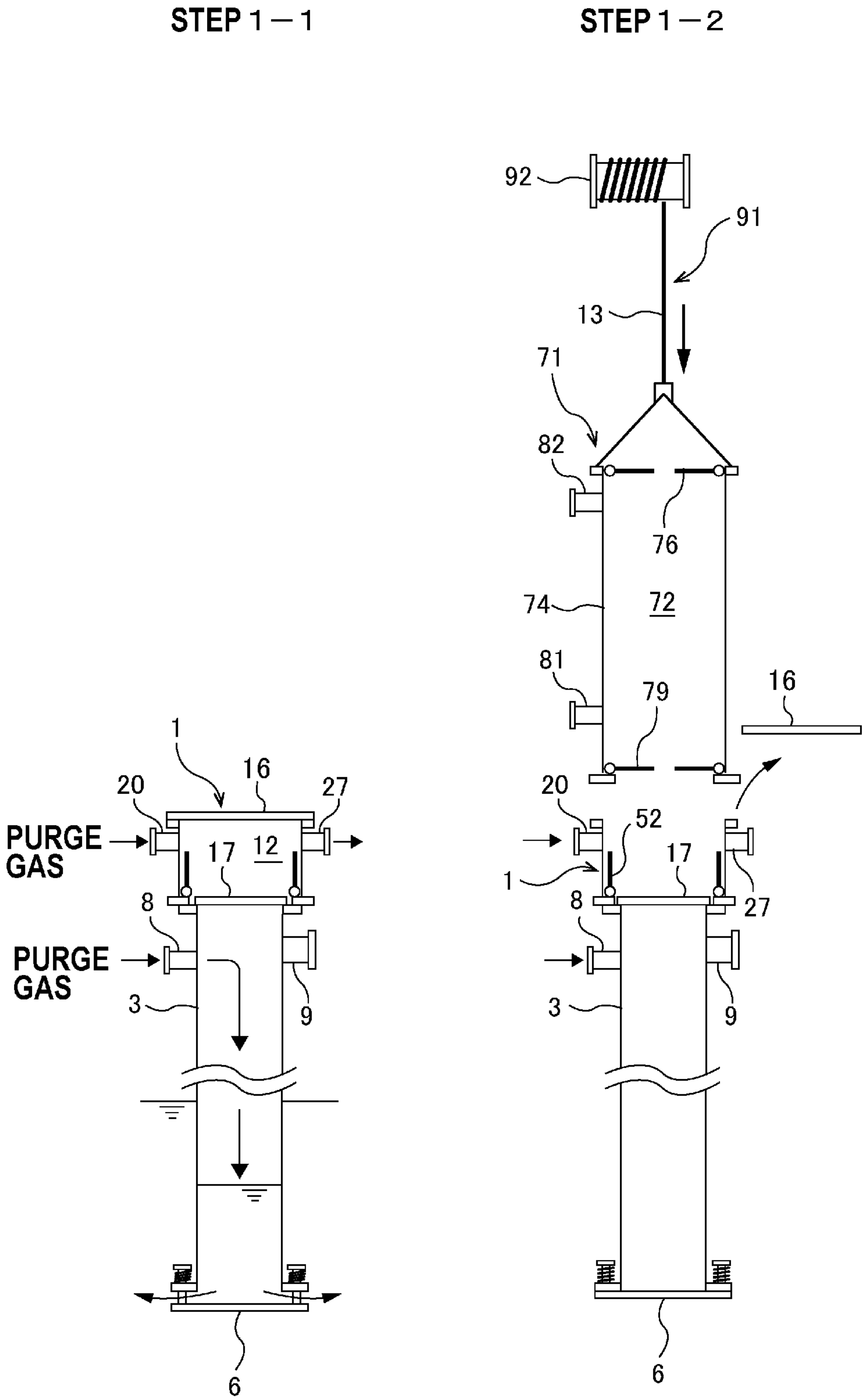
FIG. 4 is a diagram illustrating an operation of carrying a submersible pump into the pump column.

As shown in step 1-1 of FIG. 4, the liquefied gas is discharged from the pump column 3. Specifically, with the upper opening of the pump column 3 closed by the buffer gate 1, the purge gas is supplied into the pump column 3 through the purge-gas introduction port 8, and the liquefied gas is discharged from the pump column 3 through the suction valve 6 by the pressure of the purge gas.

In step 1-2, the partition wall 16 is removed from the buffer gate 1, and the purge container 71 is placed on the buffer gate 1 by an elevating device 91. The elevating device 91 has a take-up device 92, such as a hoist or a winch, configured to hoist the suspension cable 13. The purge container 71 is coupled to the upper end of the buffer gate 1 by a fastening mechanism (e.g., screws).

Figure 5:
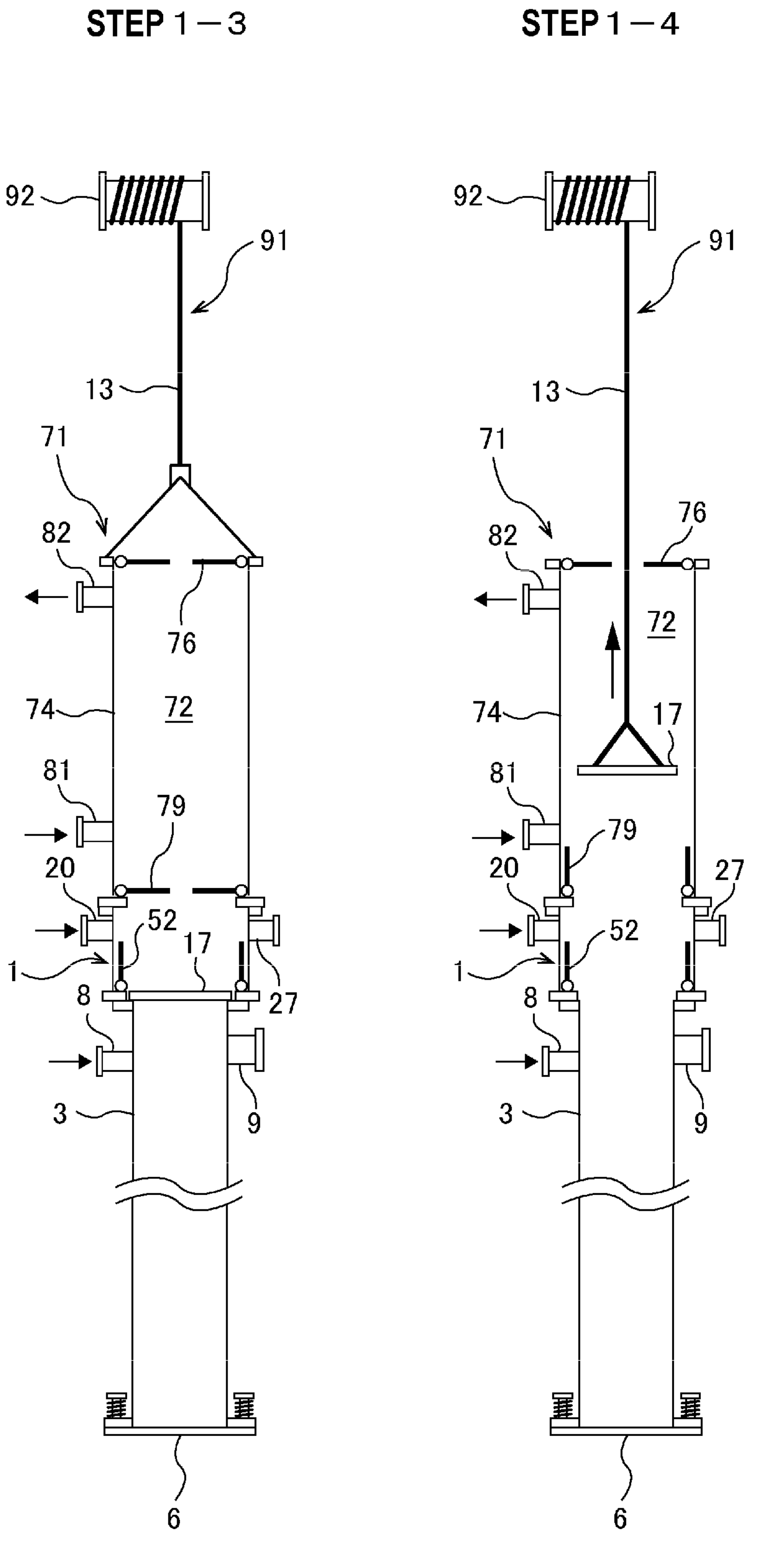
FIG. 5 is a diagram illustrating an operation of carrying a submersible pump into the pump column.

As shown in FIG. 5, in step 1-3, the purge gas is supplied into the interior space 72 of the purge container 71 through the purge-gas inlet port 81, and the interior space 72 is filled with the purge gas. The purge gas is discharged from the interior space 72 through the purge-gas outlet port 82.

In step 1-4, the partition wall 17 is coupled to the suspension cable 13 of the elevating device 91, and is removed from the buffer gate 1 by the elevating device 91. Each of the upper lid 76, the gate valve 79, and the gate valve 52 has a cable pass-through portion, such as a hole or a cut, through which the suspension cable 13 can pass. Shapes and configurations of the cable pass-through portions are not particularly limited as long as the suspension cable 13 can pass therethrough.

When the partition wall 17 passes through the buffer gate 1 and the purge container 71, at least one of the upper lid 76, the gate valve 79, and the gate valve 52 is closed. Specifically, before the partition wall 17 moves in the buffer gate 1, the gate valve 79 is opened and the upper lid 76 remains closed. After the partition wall 17 moves from the buffer gate 1 into the purge container 71, the gate valve 52 and the gate valve 79 are closed. Then, when the partition 17 reaches directly under the upper lid 76, the upper lid 76 is opened, and after the partition 17 is out of the purge container 71, the upper lid 76 is closed. Such operations can prevent ambient air from entering the pump column 3 through the purge container 71 and the buffer gate 1.

Figure 6:
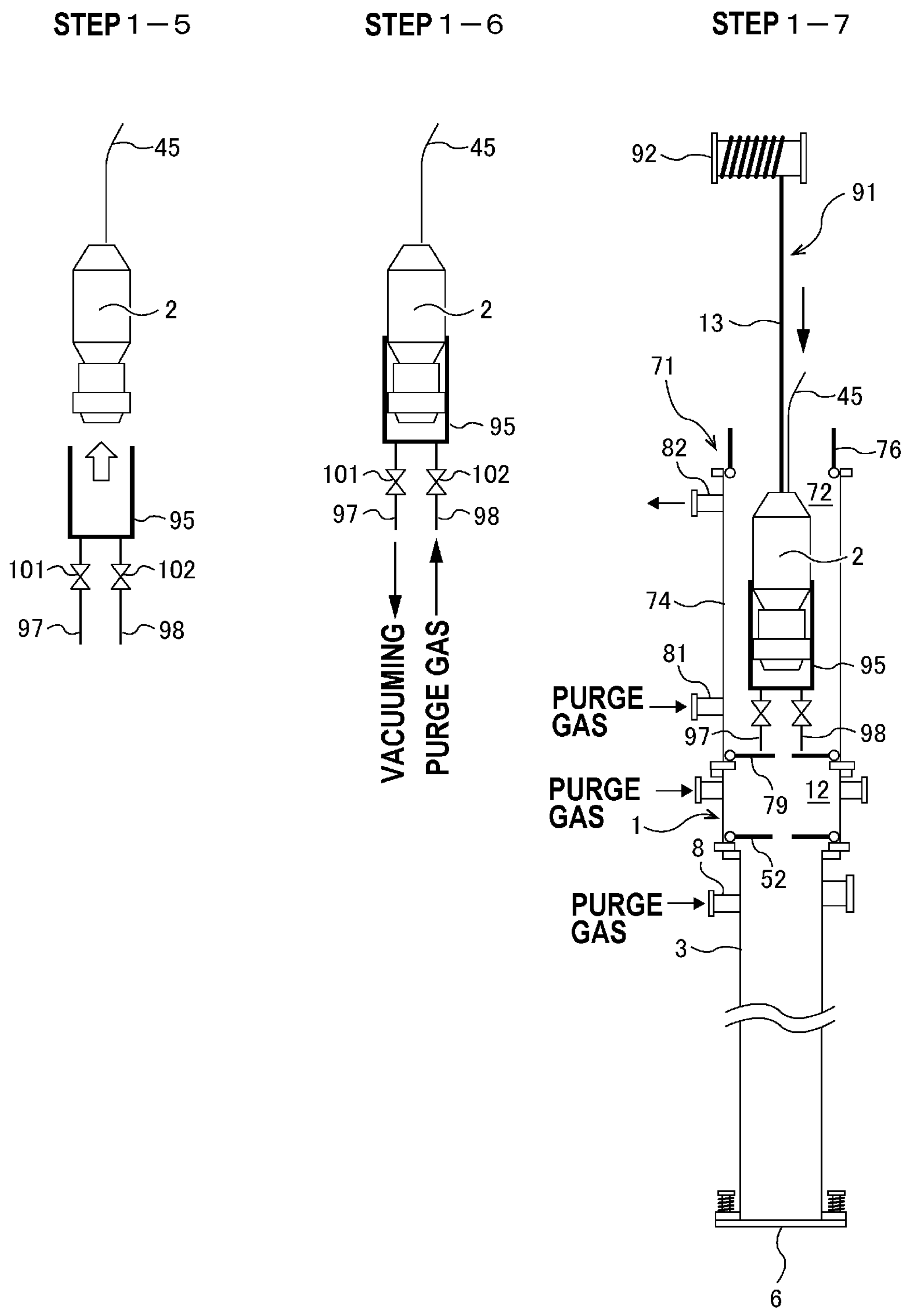
FIG. 6 is a diagram illustrating an operation of carrying a submersible pump into the pump column.

As shown in FIG. 6, in step 1-5, a pump cover 95 is attached to the submersible pump 2, so that openings of the submersible pump 2, i.e., a suction port and a discharge port, are closed with the pump cover 95. A pump vacuum line 97 and a pump purge line 98 are coupled to the pump cover 95. The pump vacuum line 97 is coupled to a vacuum source (not shown), such as a vacuum pump, and the pump purge line is coupled to a purge-gas supply source (not shown). A vacuum valve 101 is attached to the pump vacuum line 97, and a pump purge valve 102 is attached to the pump purge line 98.

In step 1-6, purge gas composed of inert gas, such as nitrogen gas or helium gas, is supplied to the interior of the submersible pump 2 through the pump purge line 98, while gas in the submersible pump 2 is sucked through the pump vacuum line 97. Nitrogen gas as the purge gas may be supplied into the submersible pump 2 at first, and then helium gas as the purge gas may be supplied into the submersible pump 2 instead of the nitrogen gas. The purge gas purges air and moisture from the interior of the submersible pump 2. After the purging of air and moisture from the interior of the submersible pump 2 is completed, the vacuum valve 101 and the pump purge valve 102 are closed.

In step 1-7, with the gate valve 79 and the gate valve 52 closed and the upper lid 76 opened, the submersible pump 2 is suspended from the cable 13 of the elevating device 91 together with the pump cover 95, and is moved into the interior space 72 of the purge container 71 by the elevating device 91. In one embodiment, after the submersible pump 2 is moved into the purge container 71, the purge gas may be supplied into the submersible pump 2 through the pump purge line 98, while the interior of the submersible pump 2 is vacuumed through the pump vacuum line 97.

Figure 7:
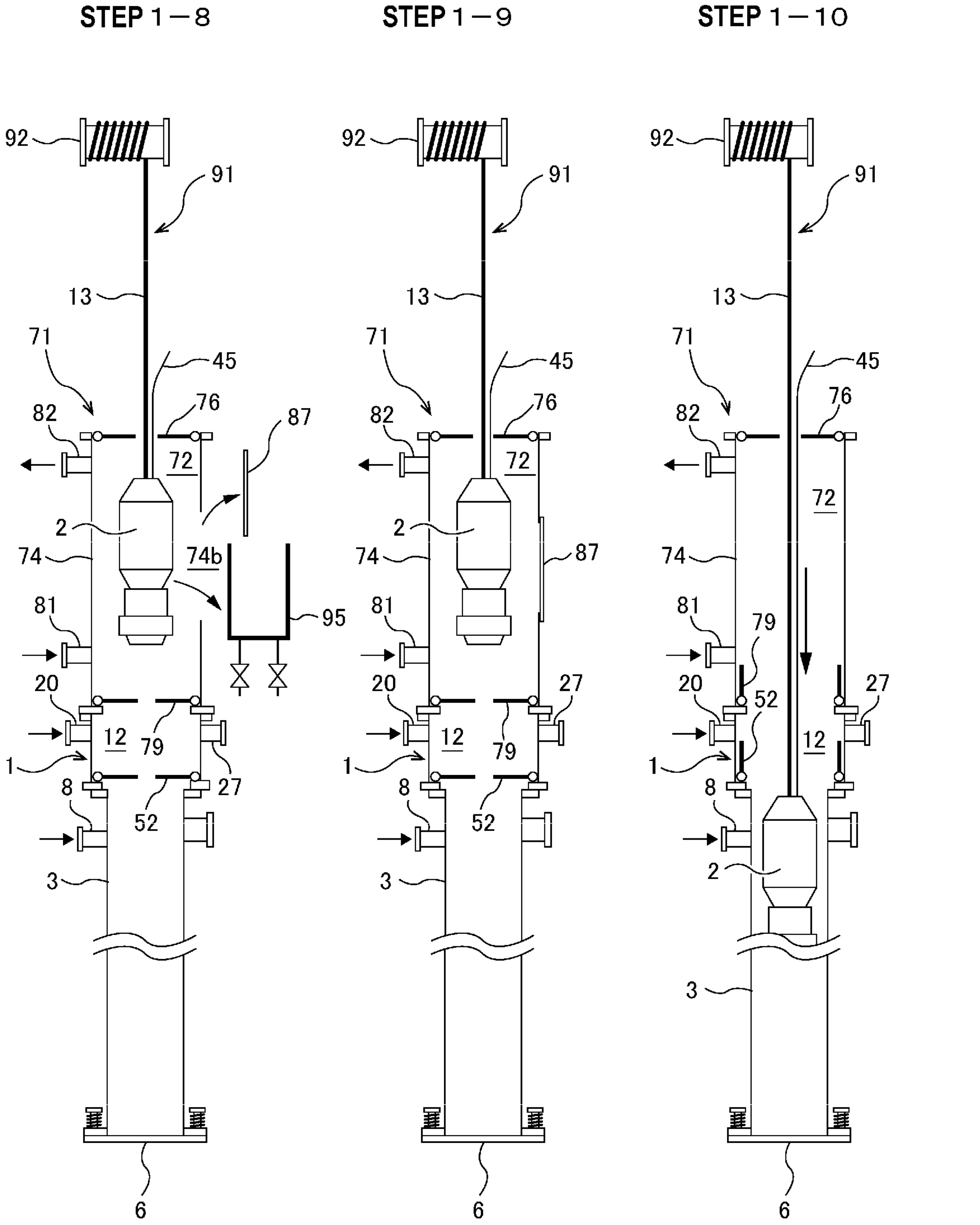
FIG. 7 is a diagram illustrating an operation of carrying a submersible pump into the pump column.

As shown in FIG. 7, in step 1-8, the upper lid 76 is closed. Further, the side lid 87 is opened, and the pump cover 95 is removed through the opening 74*b* of the container body 74.

In step 1-9, the side lid 87 is closed. The purge gas is supplied into the interior space 72 of the purge container 71 through the purge-gas inlet port 81, so that the interior space 72 is filled with the purge gas. The purge gas is discharged from the interior space 72 through the purge-gas outlet port 82. The submersible pump 2 is exposed to (contacts) the purge gas in the purge container 71, so that air and moisture are removed from surfaces of the submersible pump 2. In the following descriptions, a process of exposing the submersible pump 2 to the purge gas in the purge container 71 before the submersible pump 2 is put into the pump column 3 is called drying-up operation. During the drying-up operation, the upper lid 76, the gate valve 79, and the gate valve 52 are closed. During the steps 1-3 to 1-9, the purge gas is continuously supplied into the purge container 71, the buffer chamber 12, and the pump column 3.

After the drying-up operation for the submersible pump 2 is completed, in step 1-10, with the upper lid 76 remaining closed, the gate valve 79 and the gate valve 52 are opened, and the submersible pump 2 is then lowered (moved) from the purge container 71 through the buffer gate 1 into the pump column 3 by the elevating device 91. While the submersible pump 2 is moved from the purge container 71 through the buffer gate 1 into the pump column 3, the purge gas is continuously supplied into the purge container 71, the buffer chamber 12 of the buffer gate 1, and the pump column 3.

In one embodiment, the pressure of the purge gas supplied into the buffer chamber 12 is higher than the pressure of the purge gas supplied into the purge container 71. Such a pressure difference can prevent the air existing in the purge container 71 from entering the buffer chamber 12. Further, in one embodiment, the pressure of the purge gas supplied into the pump column 3 is higher than the pressure of the purge gas supplied into the buffer chamber 12. Such a pressure difference can prevent the air existing in the purge container 71 from entering the pump column 3 via the buffer chamber 12.

Figure 8:
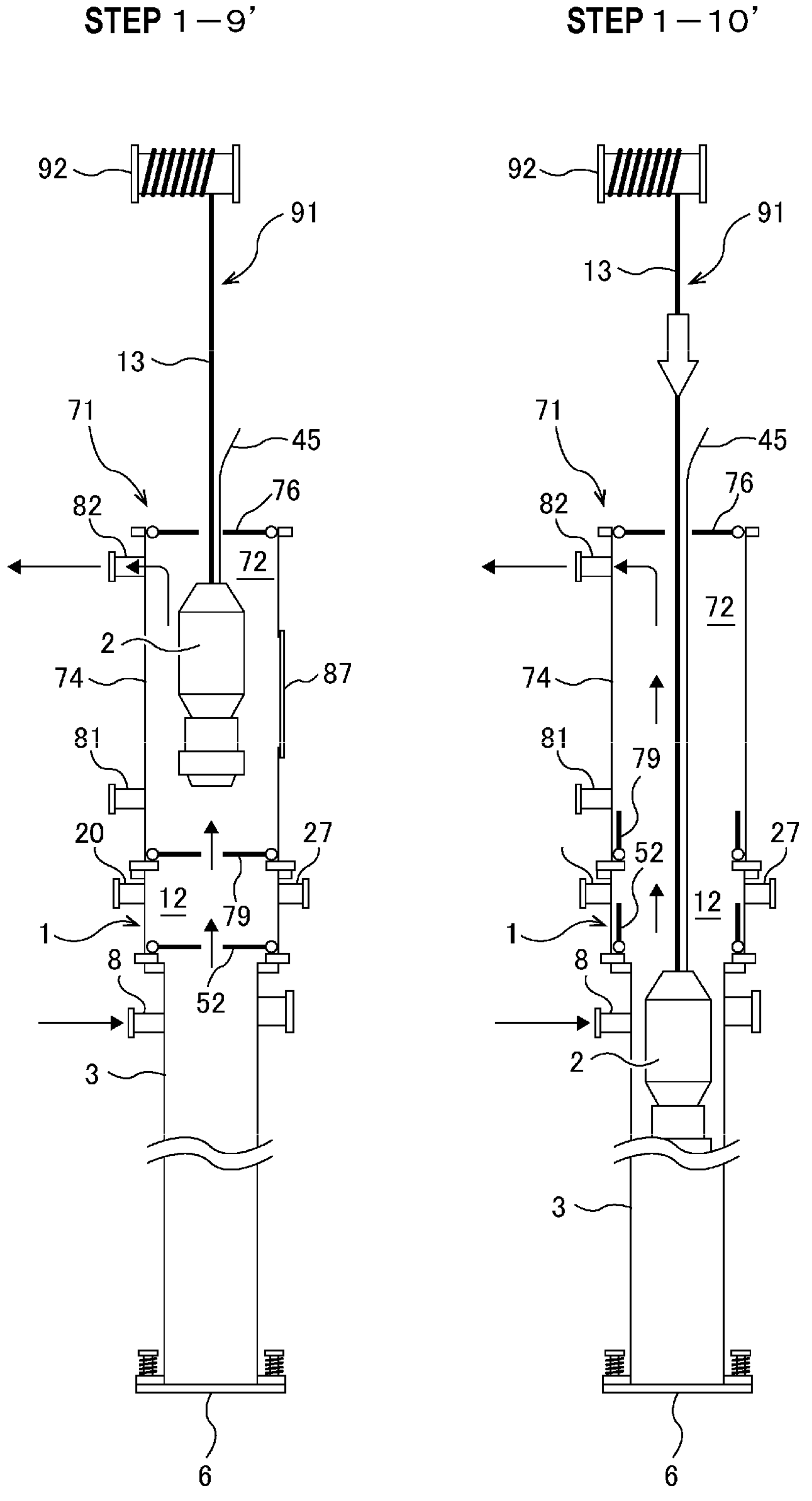
FIG. 8 is a diagram illustrating an operation of carrying a submersible pump into the pump column.

In one embodiment, in the step 1-9 and the step 1-10, the purge gas may be supplied into the pump column 3 only from the purge-gas introduction port 8, and may be discharged from the purge-gas outlet port 82 of the purge container 71 as shown in alternative step 1-9' and alternative step 1-10' of FIG. 8. The purge-gas inlet port 20, the purge-gas outlet port 27, and the purge-gas inlet port 81 are closed. Therefore, the purge gas is not supplied to the purge-gas inlet port 81 and the purge-gas inlet port 20.

The purge gas that has been supplied into the pump column 3 from the purge-gas introduction port 8 flows from the pump column 3 to the interior space 72 of the purge container 71 via the buffer chamber 12 of the buffer gate 1, and is then discharged from the interior space 72 of the purge container 71 through the purge-gas outlet port 82. The purge-gas outlet port 82 may be coupled to a vacuum source to suck the purge gas from the purge container 71. In step 1-9' of FIG. 8, the gate valve 52 and the gate valve 79 are closed. However, each of the gate valve 52 and the gate valve 79 has the cable pass-through portion, such as a hole or a cut, through which the suspension cable 13 can pass, so that the purge gas can flow through the cable pass-through portions.

Figure 9:
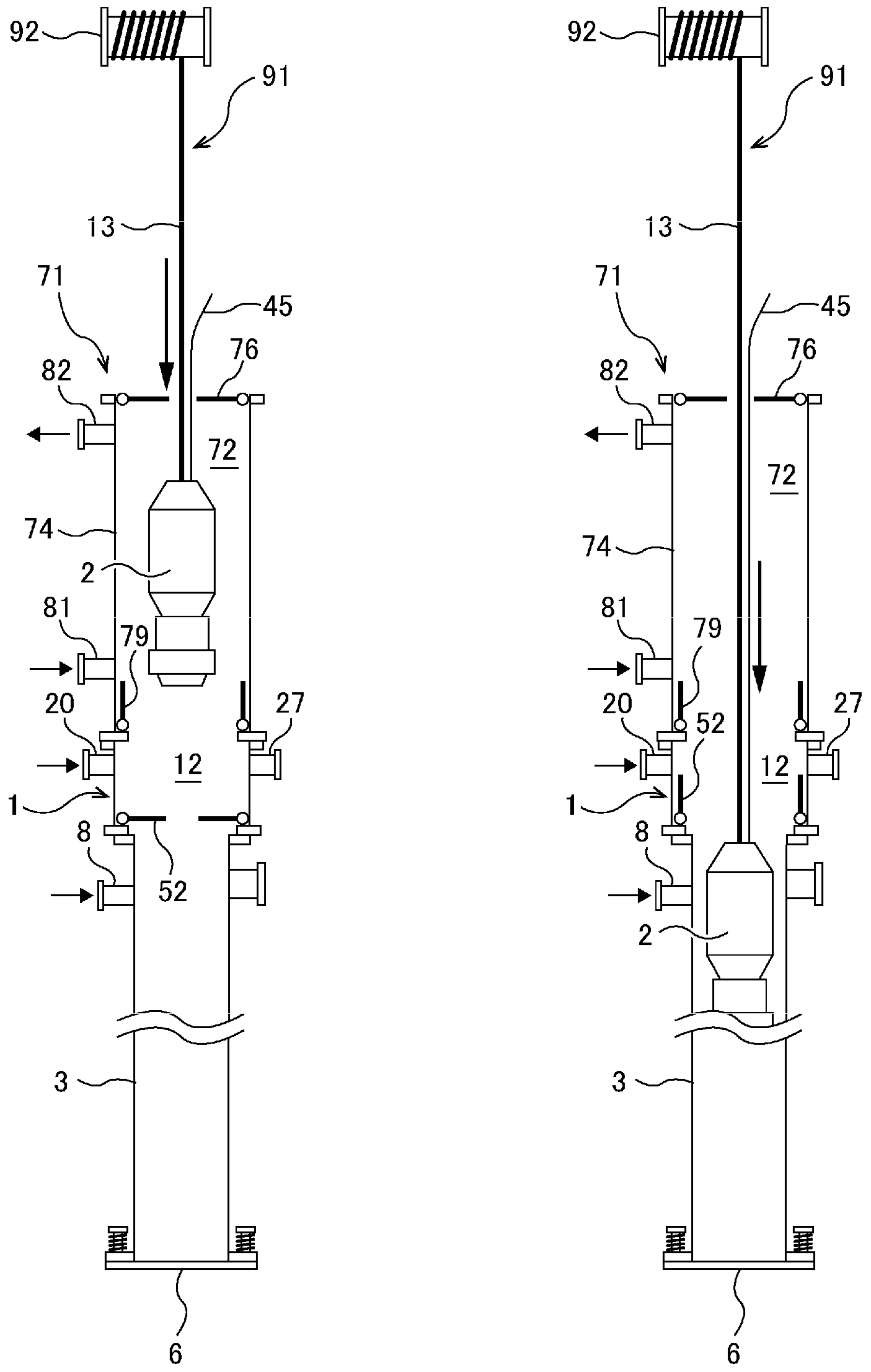
FIG. 9 is a diagram illustrating an operation of carrying a submersible pump into the pump column.

In one embodiment, as shown in FIG. 9, the step 1-10 may be divided into step 1-10*a* of opening the gate valve 79 with the gate valve 52 closed, and step 1-10*b* of opening the gate valve 52 after the gate valve 79 is opened. In this case, the purge gas may be continuously supplied to both the interior space 72 of the purge container 71 and the buffer chamber 12. Alternatively, when the gate valve 79 is opened in the step 1-10*a*, the supply of the purge gas to the interior space 72 of the purge container 71 may be stopped and the supply of the purge gas to the buffer chamber 12 may be started. Further, in one embodiment, after the supply of the purge gas to the buffer chamber 12 is started in the step 1-10*a* and before the gate valve 52 is opened in the step 1-10*b*, the supply of the purge gas into the pump column 3 may be started. Specifically, the purge gas may be supplied to the purge container 71, the buffer chamber 12, and the pump column 3 in the order of the purge container 71, the buffer chamber 12, and the pump column 3.

Figure 10:
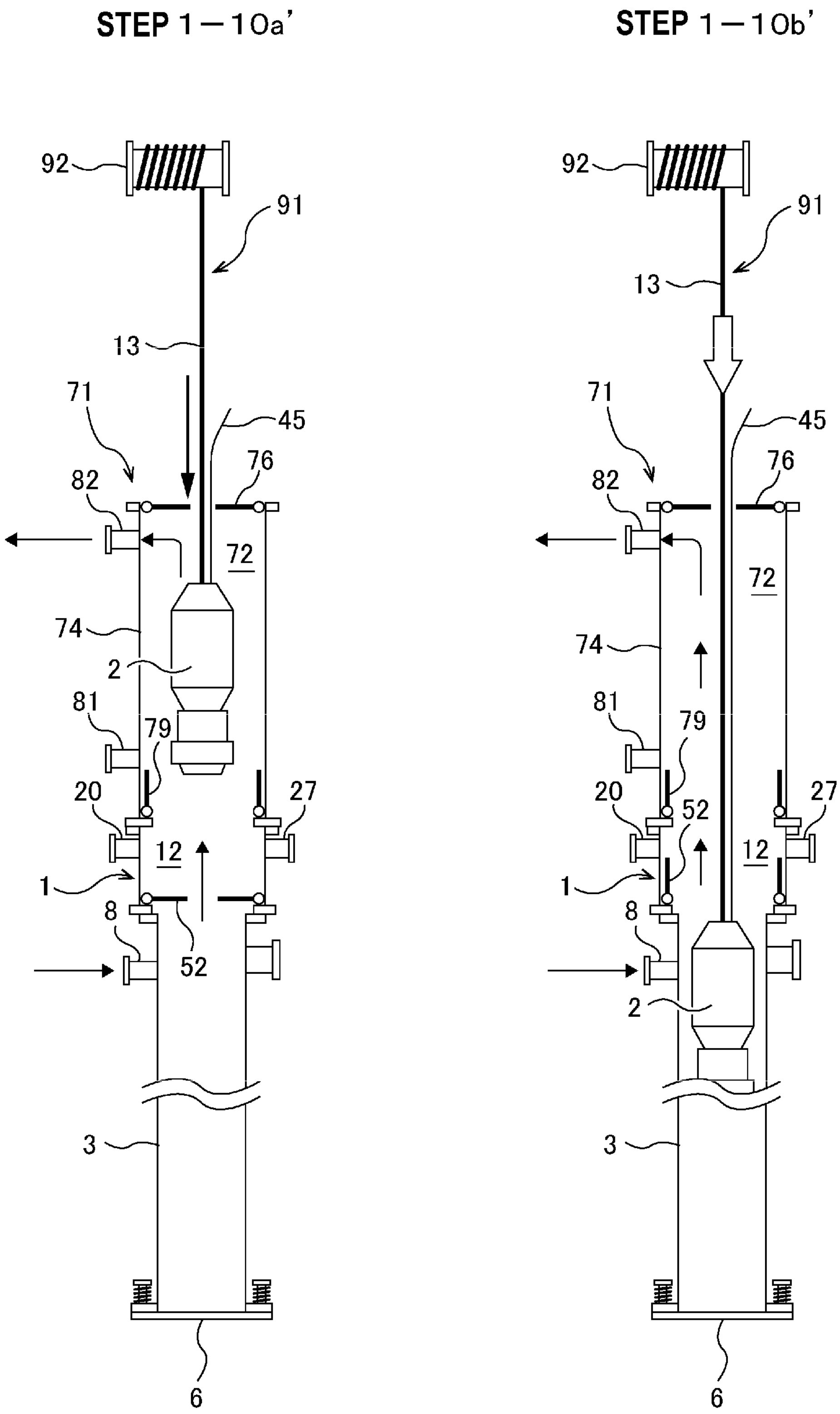
FIG. 10 is a diagram illustrating an operation of carrying a submersible pump into the pump column.

In one embodiment, in the step 1-10*a* and the step 1-10*b*, the purge gas may be supplied into the pump column 3 only from the purge-gas introduction port 8, and may be discharged from the purge-gas outlet port 82 of the purge container 71 as shown in alternative step 1-10*a*' and alternative step 1-10*b*' of FIG. 10. The purge gas is not supplied to the purge-gas inlet port 81 and the purge-gas inlet port 20. The purge gas flows from the pump column 3 to the interior space 72 of the purge container 71 via the buffer chamber 12 of the buffer gate 1, and is then discharged from the interior space 72 of the purge container 71 through the purge-gas outlet port 82. The purge-gas outlet port 82 may be coupled to a vacuum source to suck the purge gas from the purge container 71. Purge-gas supplying operation of the embodiment shown in FIG. 10, which will not be particularly described, is the same as the purge-gas supplying operation of the embodiment shown in FIG. 8, and duplicated descriptions will be omitted.

Figure 11:
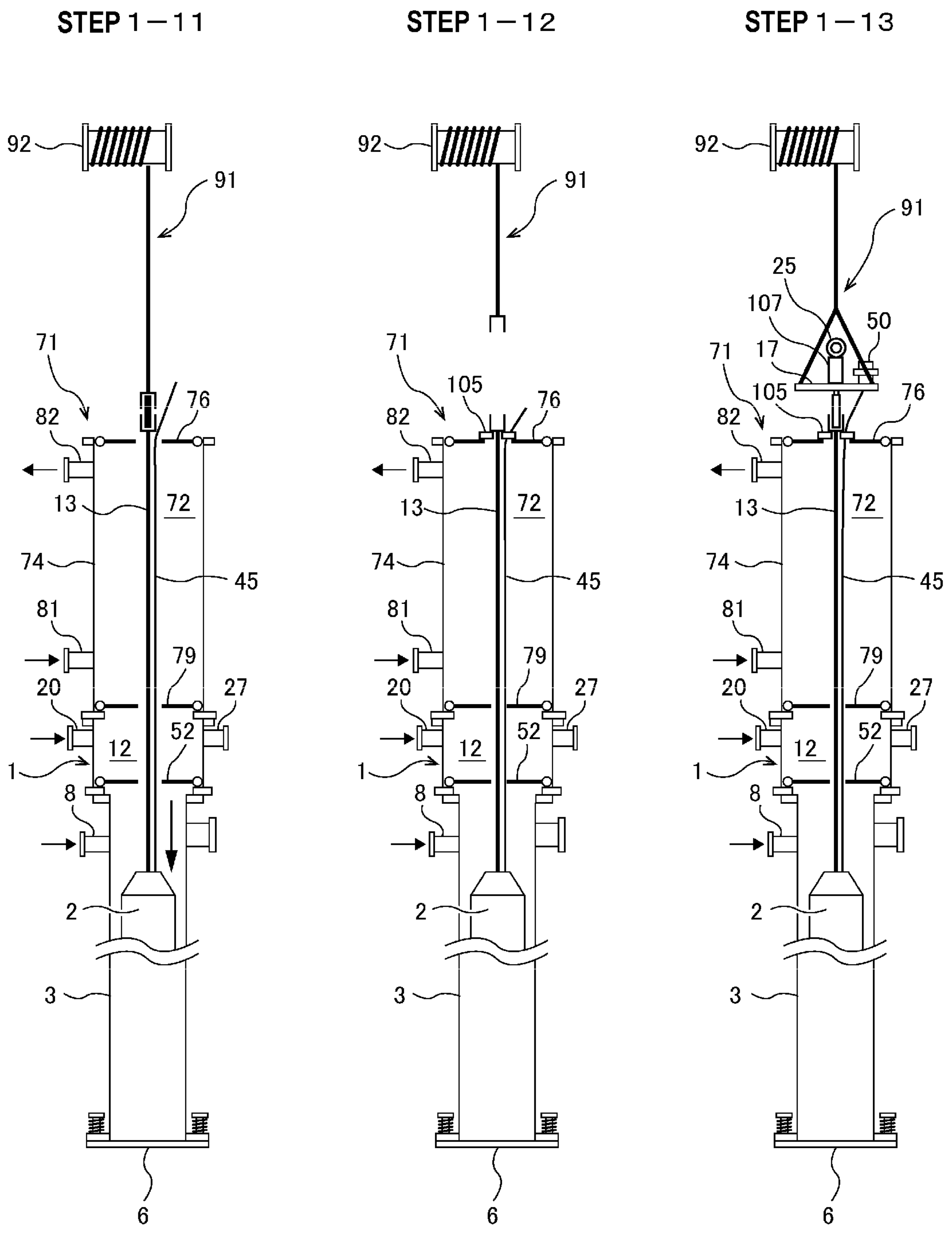
FIG. 11 is a diagram illustrating an operation of carrying a submersible pump into the pump column.

As shown in FIG. 11, in step 1-11, the gate valve 79 and the gate valve 52 are closed after the submersible pump 2 moves into the pump column 3. With the upper cover 76, the gate valve 79, and the gate valve 52 closed, the submersible pump 2 is lowered within the pump column 3 by the elevating device 91.

In step 1-12, a cable stopper 105 is attached to the suspension cable 13 coupled to the submersible pump 2. The cable stopper 105 is placed on the upper lid 76. The load of the submersible pump 2 is supported by the upper lid 76 via the suspension cable 13 and the cable stopper 105.

In step 1-13, the partition wall 17 is coupled to the elevating device 91, and the suspension cable 13 is coupled to the movable rod 25 extending through the partition wall 17. The movable rod 25 extends through the partition wall 17, and a relative position of the movable rod 25 with respect to the partition wall 17 is fixed by a rod stopper 107. The suspension cable 13 is coupled to a lower end of the movable rod 25. In this stage, the load of the submersible pump 2 is supported by the upper lid 76 via the suspension cable 13 and the cable stopper 105. The electrical terminal 50 is attached to an upper surface of the partition wall 17 in advance. The power cable 45 extending from the submersible pump 2 is electrically coupled to the electrical terminal 50.

In step 1-14, the cable stopper 105 is removed, and the upper lid 76 is opened. The partition wall 17 and the submersible pump 2 are supported by the elevating device

91. Then, the partition wall 17 and the submersible pump 2 are lowered by the elevating device 91.

In step 1-15, when the partition wall 17 has been lowered to the inside of the purge container 71, the lowering of the partition wall 17 and the submersible pump 2 is temporarily stopped, and the upper lid 76 is closed. The purge gas is supplied into the interior space 72 of the purge container 71 through the purge-gas inlet port 81, and the interior space 72 is filled with the purge gas. The purge gas is discharged from the interior space 72 through the purge-gas outlet port 82. The partition wall 17 is exposed to (contacts) the purge gas in the purge container 71, so that air and moisture are removed from surfaces of the partition wall 17. This step is drying-up operation for the partition wall 17. During the drying-up operation for the partition wall 17, the upper lid 76, the gate valve 79, and the gate valve 52 are closed, and the purge gas is continuously supplied into the purge container 71, the buffer chamber 12, and the pump column 3.

After the drying-up operation for the partition wall 17 is completed, in step 1-16, with the upper lid 76 remaining closed, the gate valve 79 and the gate valve 52 are opened. The partition wall 17 is lowered (is moved) from the purge container 71 into the buffer gate 1 by the elevating device 91, and is placed on the upper end of the pump column 3. At this time, the submersible pump 2 is located directly above the bottom of the pump column 3 (i.e., directly above the suction valve 6). While the partition wall 17 is moved from the purge container 71 into the buffer gate 1, the purge gas is continuously supplied into the purge container 71, the buffer chamber 12 of the buffer gate 1, and the pump column 3. In this way, when the partition wall 17 moves within the purge container 71 and the buffer gate 1, at least one of the upper lid 76, the gate valve 79, and the gate valve 52 is closed. Such operations can prevent ambient air from entering the pump column 3 through the purge container 71 and the buffer gate 1. The partition wall 17 is fixed to the upper end of the pump column 3 by a fastening mechanism (e.g., screws).

Figure 13:
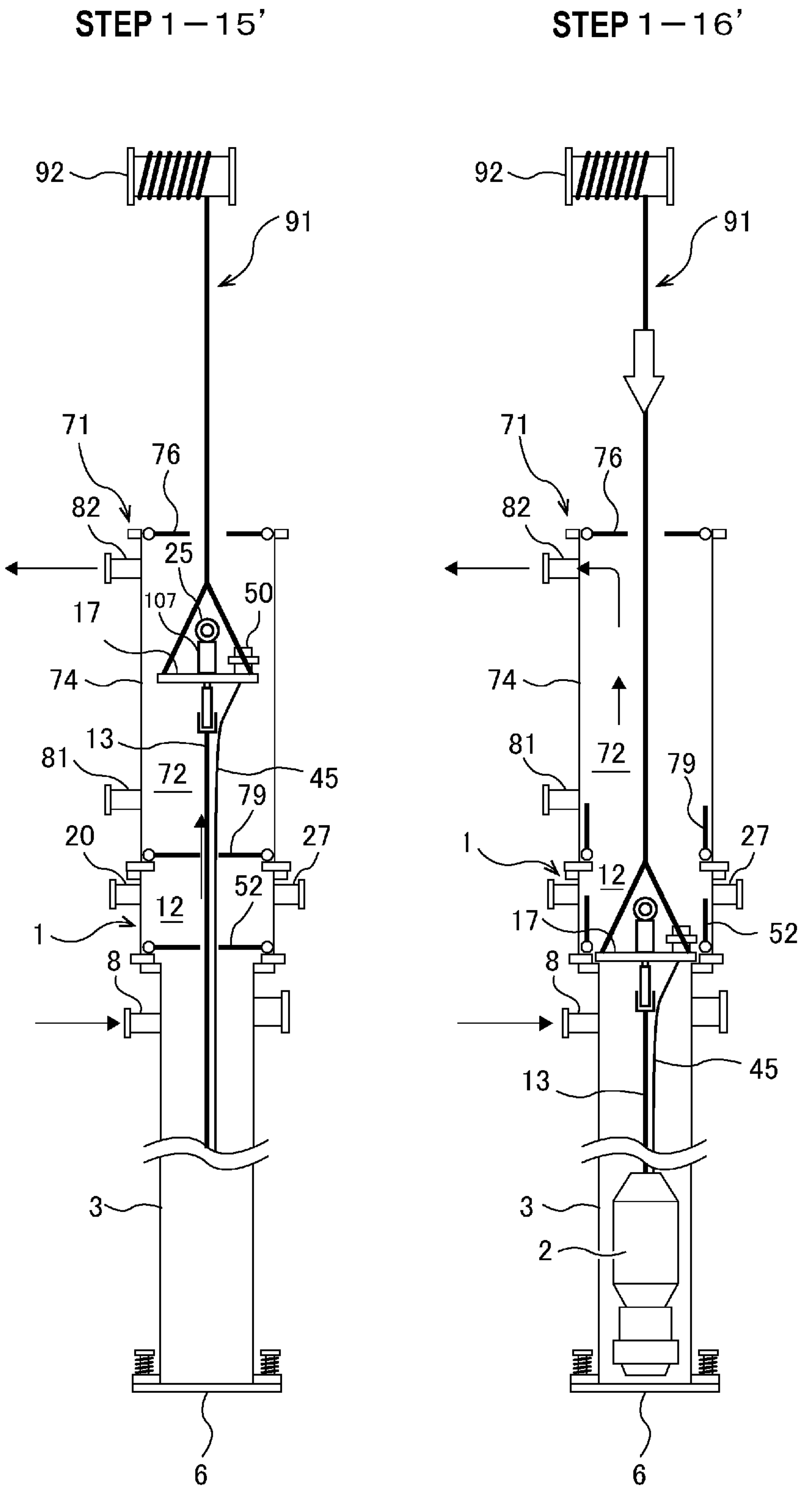
FIG. 13 is a diagram illustrating an operation of carrying a submersible pump into the pump column.
Figure 14:
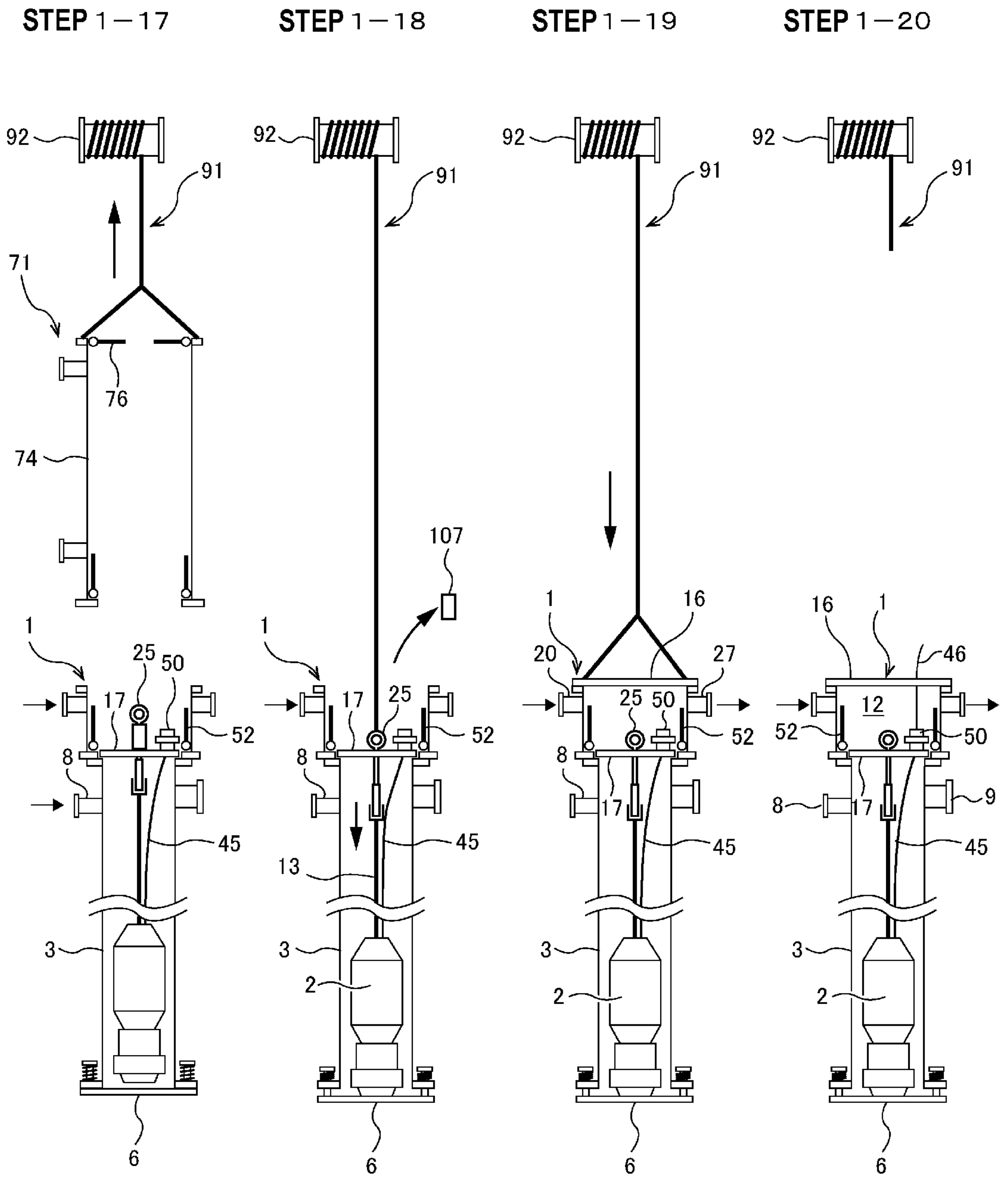
FIG. 14 is a diagram illustrating an operation of carrying a submersible pump into the pump column.
Figure 15:
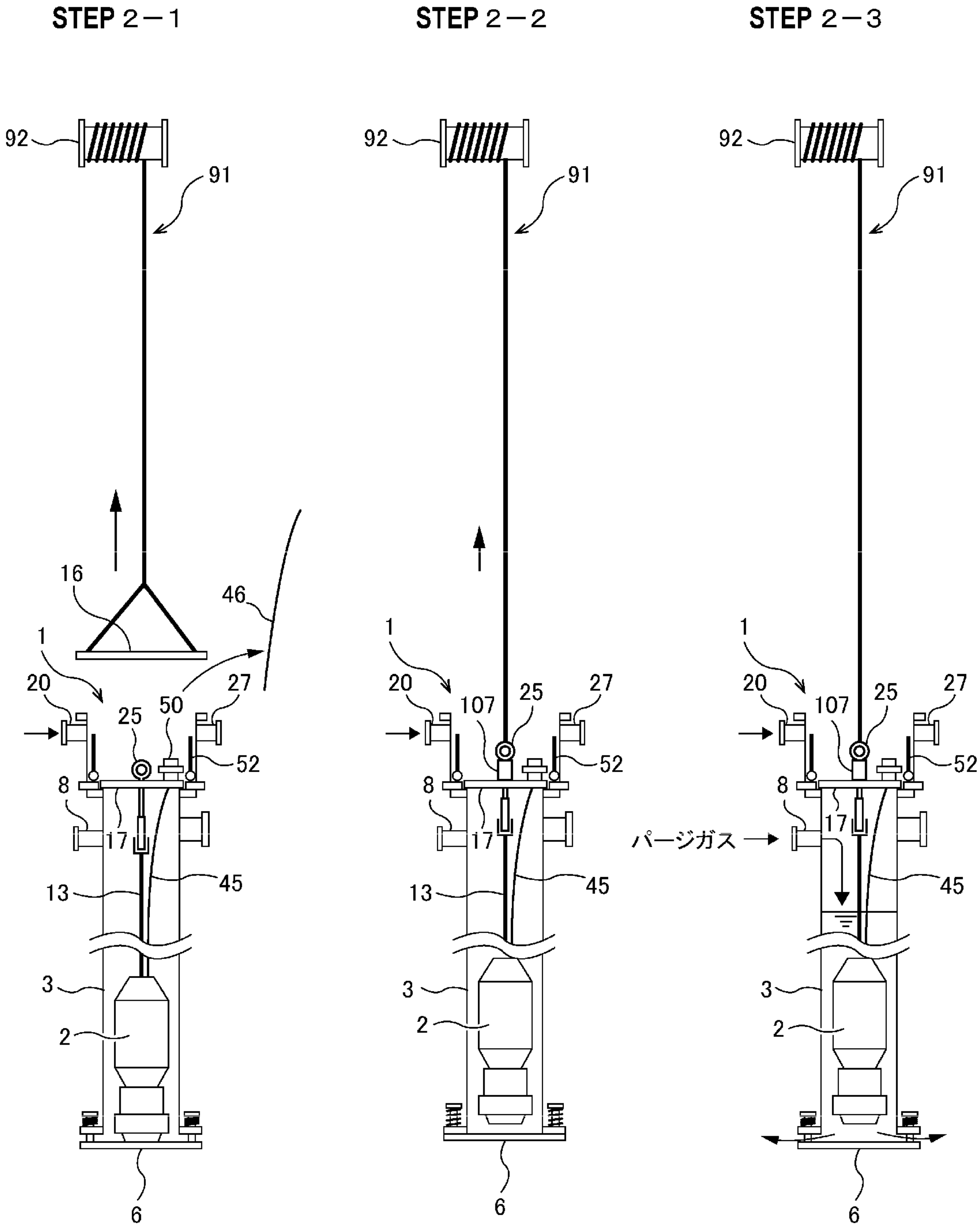
FIG. 15 is a diagram illustrating an operation of pulling up the submersible pump from the pump column.
Figure 16:
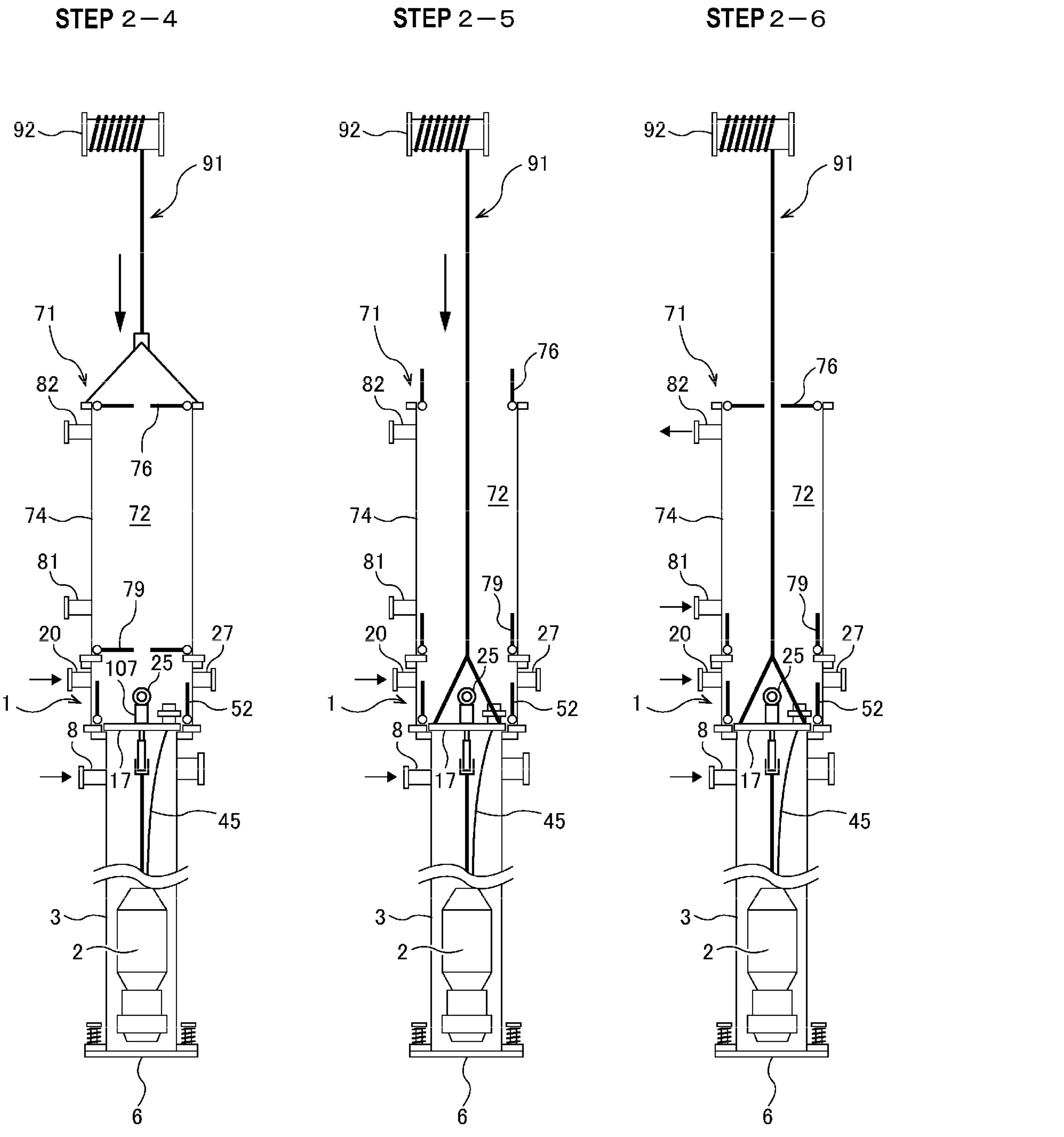
FIG. 16 is a diagram illustrating an operation of pulling up the submersible pump from the pump column.

In one embodiment, in the step 1-15 and the step 1-16, the purge gas may be supplied to the pump column 3 only from the purge-gas introduction port 8, and may be discharged from the purge-gas outlet port 82 of the purge container 71 as shown in alternative step 1-15' and alternative step 1-16' of FIG. 13. The purge gas is not supplied to the purge-gas inlet port 81 and the purge-gas inlet port 20. The purge gas flows from the pump column 3 to the interior space 72 of the purge container 71 via the buffer chamber 12 of the buffer gate 1, and is then discharged from the interior space 72 of the purge container 71 through the purge-gas outlet port 82. The purge-gas outlet port 82 may be coupled to a vacuum source to suck the purge gas from the purge container 71. In step 1-15', the gate valve 52 and the gate valve 79 are closed, while the purge gas can flow through gaps between the suspension cable 13 and the cable pass-through portions of the gate valve 52 and the gate valve 79. Purge-gas supplying operation of the embodiment shown in FIG. 13, which will not be particularly described, is the same as the purge-gas supplying operation of the embodiment shown in FIG. 8, and duplicated descriptions will be omitted.

In step 1-17, the purge container 71 is separated from the buffer gate 1, and the purge container 71 is hoisted by the elevating device 91.

In step 1-18, the movable rod 25 is directly coupled to the elevating device 91, and the rod stopper 107 is removed. Then, the submersible pump 2 is slightly lowered by the elevating device 91 together with the movable rod 25 and the suspension cable 13, until the submersible pump 2 is placed on the bottom of the pump column 3 (i.e., on the suction valve 6). Immediately before that, the introduction of the purge gas from the purge-gas introduction port 8 to the pump column 3 is stopped. The suction valve 6 is opened by the weight of the submersible pump 2, and the liquefied gas in the liquefied-gas storage tank 5 flows into the pump column 3.

The step 1-17 and the step 1-18 may be performed in reverse order. Specifically, in one embodiment, the movable rod 25 is directly coupled to the elevating device 91, and the rod stopper 107 is removed. Then, the submersible pump 2 is slightly lowered by the elevating device 91 together with the movable rod 25 and the suspension cable 13, and the submersible pump 2 is placed on the bottom of the pump column 3 (i.e., on the suction valve 6). Immediately before that, the introduction of the purge gas from the purge-gas introduction port 8 to the pump column 3 is stopped. The suction valve 6 is opened by the weight of the submersible pump 2, and the liquefied gas in the liquefied-gas storage tank 5 flows into the pump column 3. The purge container 71 is then separated from the buffer gate 1, and the purge container 71 is hoisted by the elevating device 91.

In step 1-19, the partition wall 16 is placed on the upper end of the buffer gate 1 by the elevating device 91.

In step 1-20, the elevating device 91 is separated from the partition wall 16, and the partition wall 16 is fixed to the upper end of the pump column 3 by a fastening mechanism (e.g., screws). Further, the external power cable 46 is electrically coupled to the electrical terminal 50. With the above-described steps, the installation of the submersible pump 2 into the pump column 3 is completed.

The submersible pump 2 is operated to pump up the liquefied gas when the entire submersible pump 2 immersed in the liquefied gas. The submersible pump 2 is a pump configured to be operable in liquid. The liquefied gas pumped up by the submersible pump 2 is discharged through the liquefied-gas discharge port 9. During the operation of the submersible pump 2, the purge gas is continuously supplied into the buffer chamber 12.

As described above, the buffer gate 1 allows the submersible pump 2 to be carried into the pump column 3 while isolating the inside and the outside of the pump column 3. Therefore, the buffer gate 1 can prevent the air existing outside the pump column 3 from entering the pump column 3. In particular, the combination of the buffer gate 1 and the purge container 71 can reliably prevent the air and the moisture from entering the pump column 3. Specifically, air and moisture entrained with the submersible pump 2 are removed from the submersible pump 2 by the purge gas, and as a result, the submersible pump 2 is dried up or degassed (i.e., the drying-up operation for the submersible pump 2 is performed). Therefore, the air and the moisture are not entrained with the submersible pump 2, and entry of the air and the moisture into the pump column 3 can be prevented. After this drying-up operation, the submersible pump 2 can be rapidly moved into the pump column 3 via the buffer gate 1 with the purge gas existing around the submersible pump 2. During the moving of the submersible pump 2 to the pump column 3, the buffer gate 1 prevents the air and the moisture from entering the pump column 3.

Next, an embodiment of an operation of pulling up the submersible pump 2 from the pump column 3 will be described with reference to FIGS. 15 to 25. In all steps described below, the purge gas is continuously supplied to at least one of the buffer chamber 12 and the pump column 3. A series of operations shown in FIGS. 15 to 25 includes an operation of pulling up the submersible pump 2 from the pump column 3, and hot-up operation of warming the ultra-low temperature submersible pump 2 that has been in contact with the liquefied gas with the purge gas.

In step 2-1, the external power cable 46 is disconnected from the electrical terminal 50, and the partition wall 16 is removed from the buffer box 14 by the elevating device 91.

In step 2-2, the movable rod 25 is coupled to the elevating device 91, and the moving rod 25 is slightly elevated by the elevating device 91. Thus, the submersible pump 2, which is coupled to the movable rod 25 by the suspension cable 13, moves away from the suction valve 6, and the suction valve 6 is closed. Further, the rod stopper 107 is attached to the movable rod 25, so that the relative position of the movable rod 25 with respect to the partition wall 17 is fixed.

In step 2-3, the liquefied gas is discharged from the pump column 3. Specifically, with the upper opening of the pump column 3 closed by the partition wall 17 of the buffer gate 1, the purge gas is supplied into the pump column 3 through the purge-gas introduction port 8, and the liquefied gas is discharged from the pump column 3 through the suction valve 6 by the pressure of the purge gas.

In step 2-4, the purge container 71 is placed on the buffer gate 1 by the elevating device 91. The purge container 71 is coupled to the upper end of the buffer gate 1 by a fastening mechanism (e.g., screws).

In step 2-5, the upper lid 76 and the gate valve 79 are opened, and the partition wall 17 is coupled to the elevating device 91 through the purge container 71. The fastening mechanism (e.g., the screws) securing the partition wall 17 to the upper end of the pump column 3 is then removed.

In step 2-6, the upper lid 76 is closed, and the purge gas is supplied into the buffer gate 1 and the purge container 71.

Figure 17:
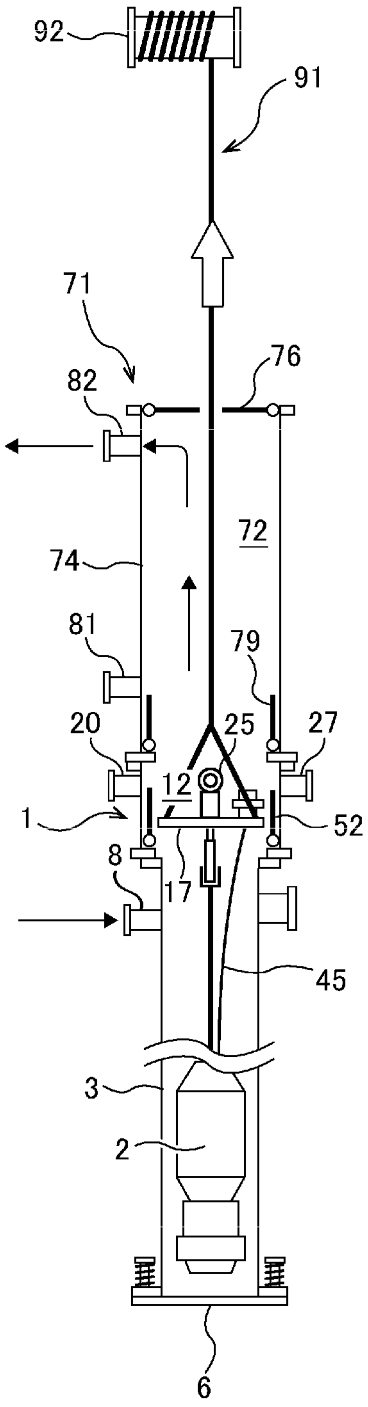
FIG. 17 is a diagram illustrating an operation of pulling up the submersible pump from the pump column.
Figure 18:
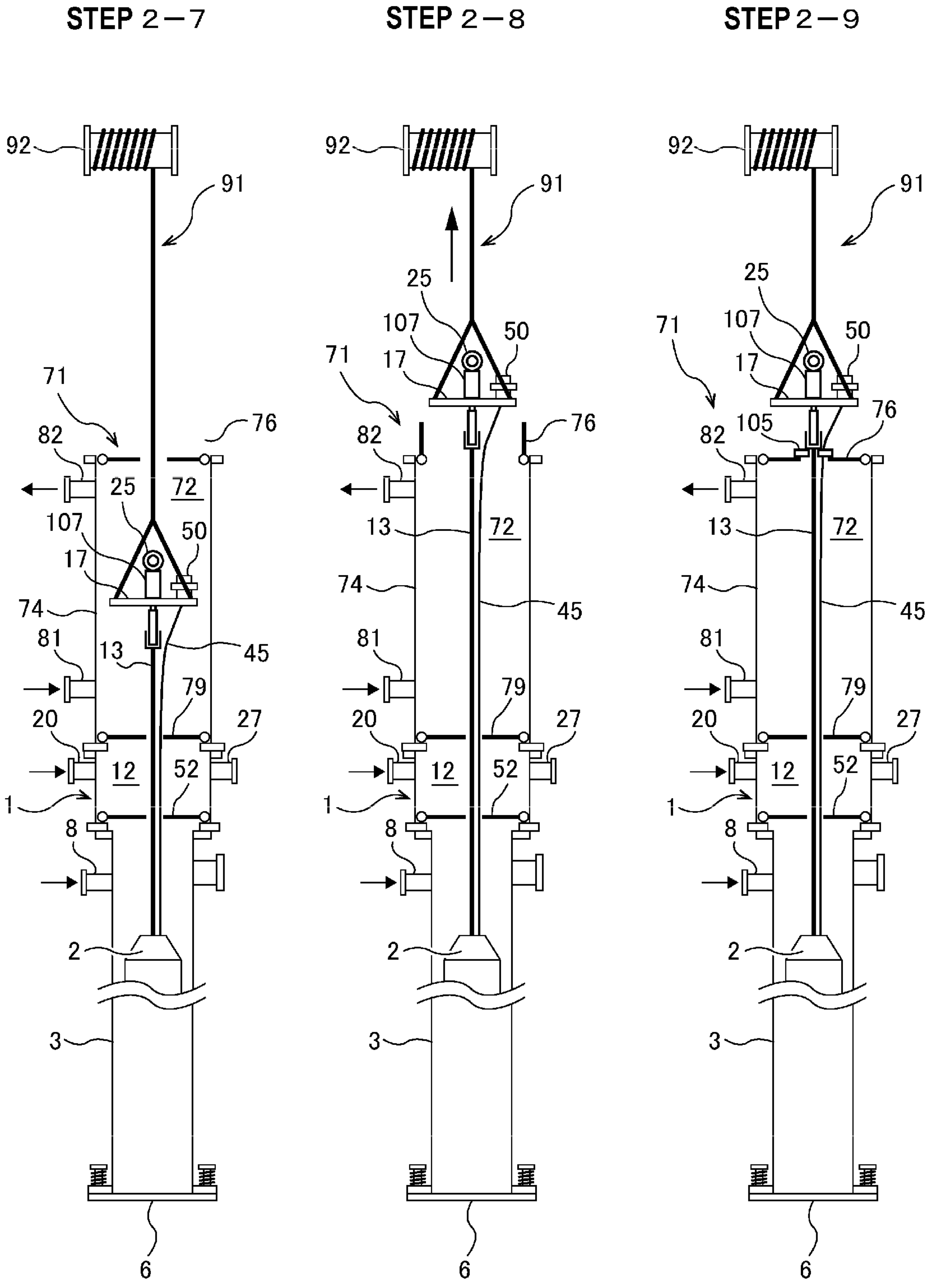
FIG. 18 is a diagram illustrating an operation of pulling up the submersible pump from the pump column.
Figure 19:
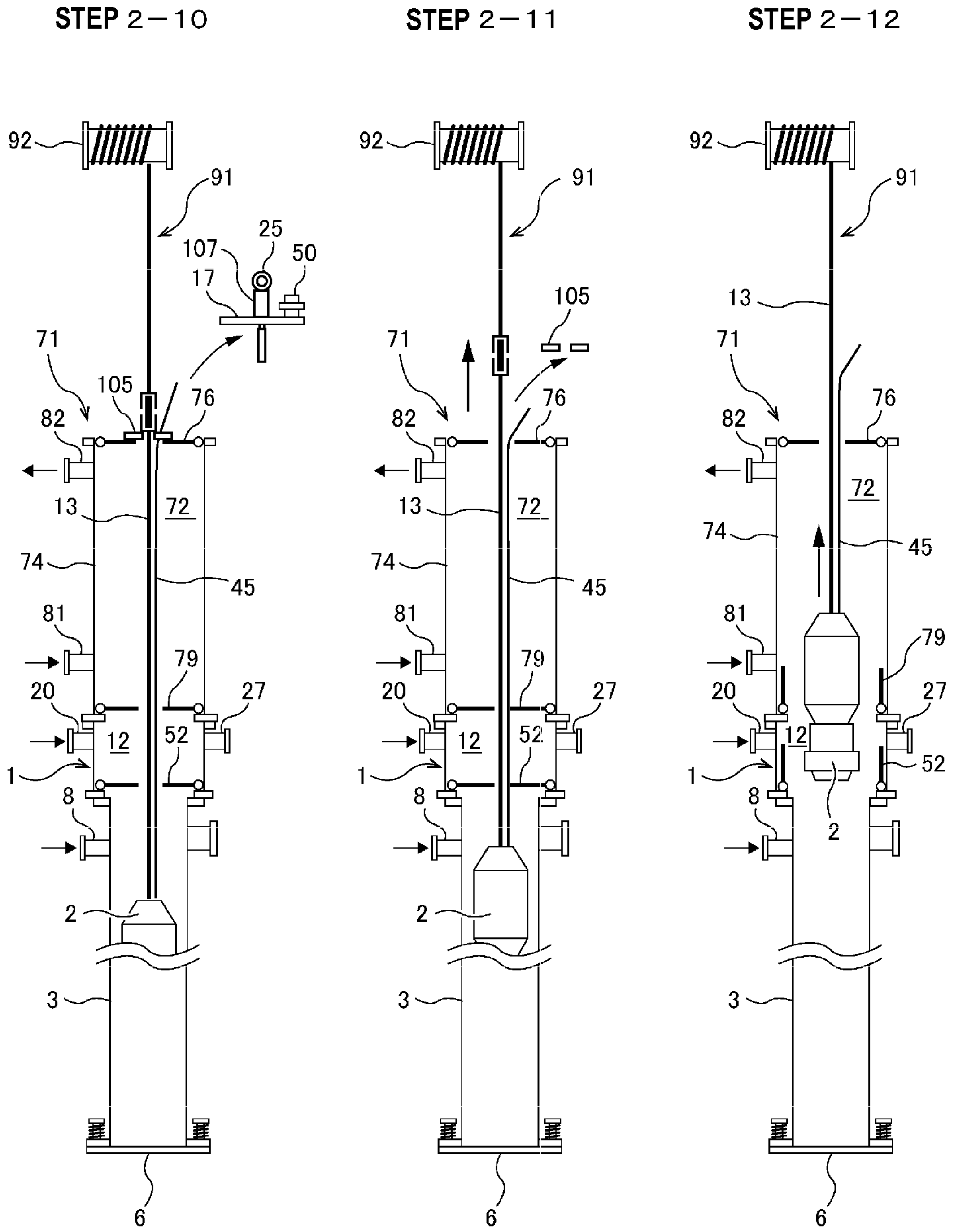
FIG. 19 is a diagram illustrating an operation of pulling up the submersible pump from the pump column.

In one embodiment, in the step 2-6, after the upper lid 76 is closed and immediately after the pulling up of the partition wall 17 is started by the elevating device 91, the purge gas may be supplied into the pump column 3 only from the purge-gas introduction port 8, and may be discharged from the purge-gas outlet port 82 of the purge container 71 as shown in alternative step 2-6' of FIG. 17. The purge-gas inlet port 20, the purge-gas outlet port 27, and the purge-gas inlet port 81 are closed. Therefore, the purge gas is not supplied to the purge-gas inlet port 81 and the purge-gas inlet port 20.

The purge gas flows from the pump column 3 to the interior space 72 of the purge container 71 via the buffer chamber 12 of the buffer gate 1, and is then discharged from the interior space 72 of the purge container 71 through the purge-gas outlet port 82. The purge-gas outlet port 82 may be coupled to a vacuum source to suck the purge gas from the purge container 71.

In step 2-7, the partition wall 17 is elevated to the inside of the purge container 71 by the elevating device 91, and the elevating of the partition wall 17 is temporarily stopped. The gate valve 79 and the gate valve 52 are closed, and with this condition, the partition wall 17 is warmed (i.e., the hot-up operation for the partition wall 17 is performed) by the purge gas.

In step 2-8, after the hot-up operation for the partition wall 17 is completed, the upper lid 76 is opened. The partition wall 17 and the submersible pump 2 are elevated by elevating device 91 until the partition wall 17 is out of the purge container 71. The hot-up operation for the partition wall 17 is performed before the partition wall 17 contacts ambient air, so that moisture in the air is not liquefied or solidified on the surfaces of the partition wall 17. While the partition wall 17 moves within the buffer gate 1 and the purge container 71, at least one of the upper lid 76, the gate valve 79, and the gate valve 52 is closed. More specifically, with the upper lid 76 closed, the gate valve 79 and the gate valve 52 are opened. The partition wall 17 is moved from the buffer gate 1 into the purge container 71. The gate valve 79 and the gate valve 52 are then closed, the upper lid 76 is opened, and the partition wall 17 is removed from the purge container 71. Such operations can prevent the ambient air from entering the pump column 3 through the purge container 71 and the buffer gate 1.

In step 2-9, the upper lid 76 is closed, and the cable stopper 105 is attached to the suspension cable 13 coupled to the submersible pump 2. The load of the submersible pump 2 is supported by the upper lid 76 via the suspension cable 13 and the cable stopper 105.

In step 2-10, the partition wall 17, the movable rod 25, and the electrical terminal 50 are separated from the elevating device 91, the suspension cable 13, and the power cable 45, respectively. The elevating device 91 is then coupled to the suspension cable 13.

In step 2-11, the cable stopper 105 is removed, and the submersible pump 2 is elevated in the pump column 3 by the elevating device 91. While the submersible pump 2 is elevated in the pump column 3, the upper lid 76, the gate valve 79, and the gate valve 52 remain closed.

In step 2-12, the submersible pump 2 is pulled up from the pump column 3 through the buffer gate 1 to a predetermined position in the purge container 71 by the elevating device 91. More specifically, with the upper lid 76 closed, the gate valve 79 and the gate valve 52 are opened, and the submersible pump 2 passes through the buffer gate 1.

While the submersible pump 2 is moved from the pump column 3 through the buffer gate 1 into the purge container 71, the purge gas is continuously supplied to the purge container 71, the buffer chamber 12 of the buffer gate 1, and the pump column 3.

In one embodiment, the pressure of the purge gas supplied into the buffer chamber 12 is higher than the pressure of the purge gas supplied into the purge container 71. Such a pressure difference can prevent the air existing in the purge container 71 from entering the buffer chamber 12. Further, in one embodiment, the pressure of the purge gas supplied into the pump column 3 is higher than the pressure of the purge gas supplied into the buffer chamber 12. Such a pressure difference can prevent the air existing in the purge container 71 from entering the pump column 3 via the buffer chamber 12.

Figure 20:
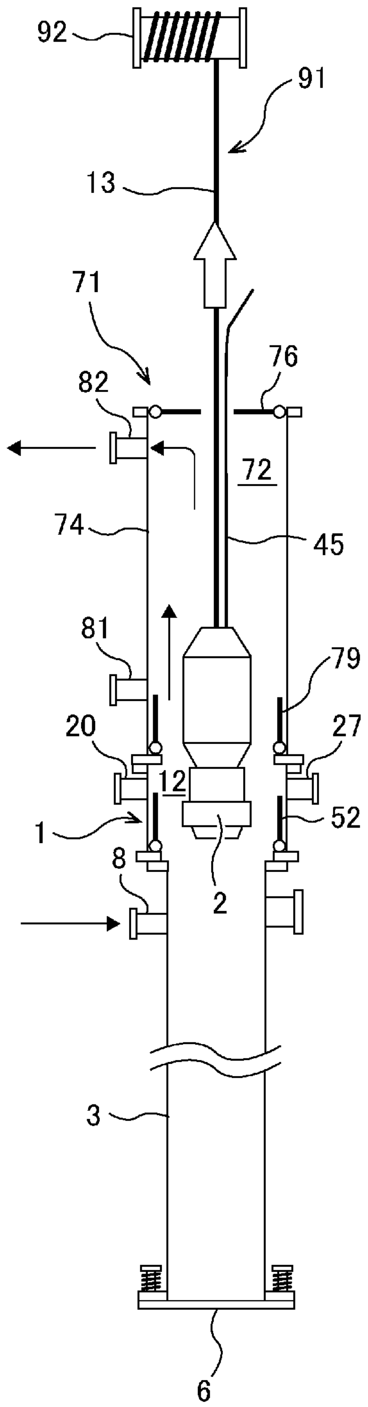
FIG. 20 is a diagram illustrating an operation of pulling up the submersible pump from the pump column.

In one embodiment, in the step 2-12, the purge gas may be supplied to the pump column 3 only from the purge-gas introduction port 8, and may be discharged from the purge-gas outlet port 82 of the purge container 71 as shown in alternative step 2-12' of FIG. 20. The purge gas is not supplied to the purge-gas inlet port 81 and the purge-gas inlet port 20. The purge gas flows from the pump column 3 to the interior space 72 of the purge container 71 via the buffer chamber 12 of the buffer gate 1, and is then discharged from the interior space 72 of the purge container 71 through the purge-gas outlet port 82. The purge-gas outlet port 82 may be coupled to a vacuum source to suck the purge gas from the purge container 71. Purge-gas supplying operation of the embodiment shown in FIG. 20, which will not be particularly described, is the same as the purge-gas supplying operation of the embodiment shown in FIG. 17, and duplicated descriptions will be omitted.

Figure 21:
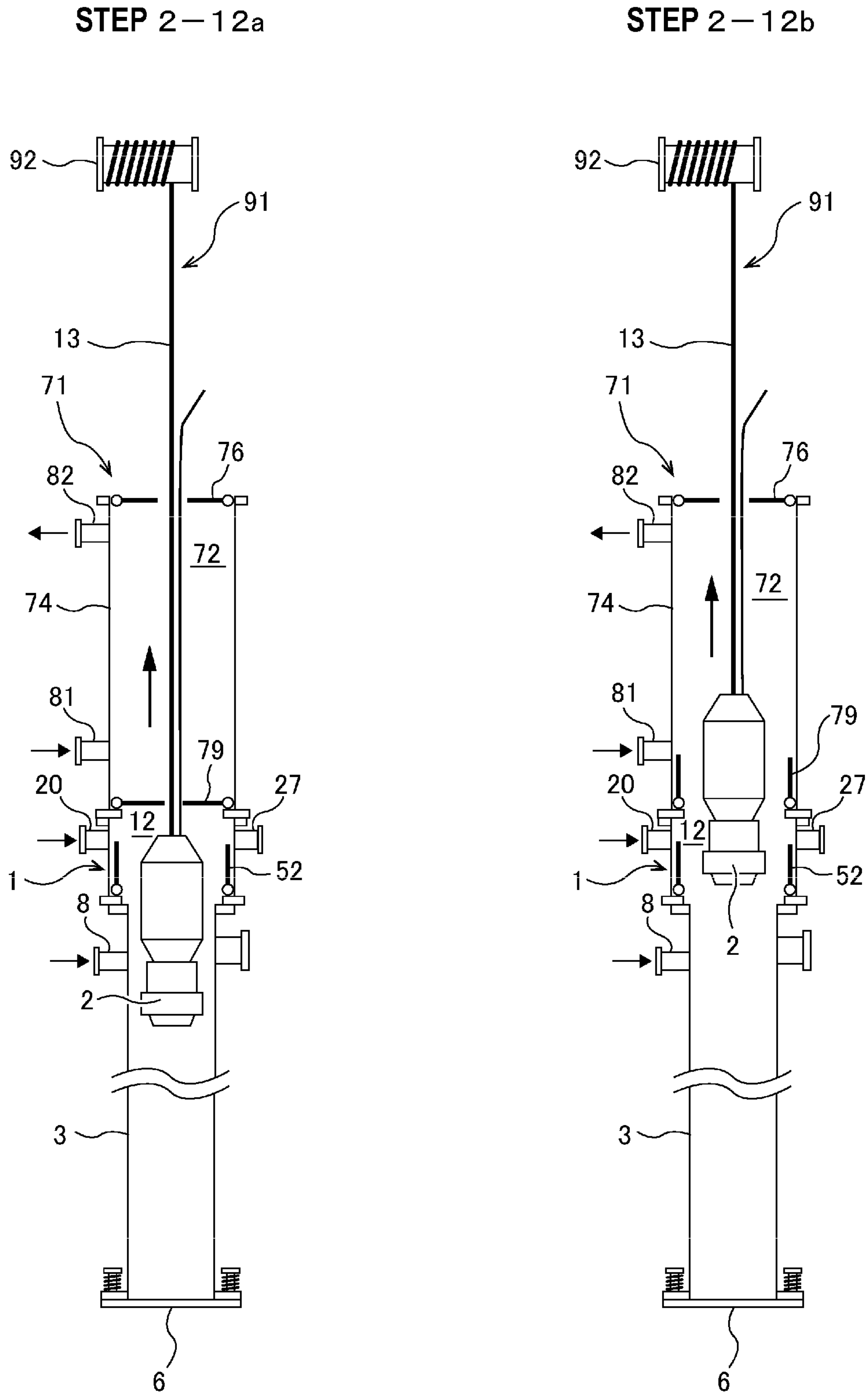
FIG. 21 is a diagram illustrating an operation of pulling up the submersible pump from the pump column.

In one embodiment, as shown in FIG. 21, the step 2-12 may be divided into step **2-12*a* of opening the gate valve 52 with the gate valve 79 closed, and step 2-12*b* of opening the gate valve 79 after the gate valve 52 is opened. In this case, the purge gas may be continuously supply to both the interior space 72 of the purge container 71 and the buffer chamber 12. Alternatively, when the gate valve 52 is opened in the step 2-12***a*, the supply of the purge gas to the pump column 3 may be stopped, and the supply of the purge gas to the buffer chamber 12 may be started. Further, in one embodiment, after the supply of the purge gas to the buffer chamber 12 is started and before the gate valve 79 is opened in the step 2-12*b*, the supply of the purge gas into the interior space 72 of the purge container 71 may be started. Specifically, the purge gas may be supplied to the pump column 3, the buffer chamber 12, and the purge container 71 in the order of the pump column 3, the buffer chamber 12, and the purge container 71.

Figure 22:
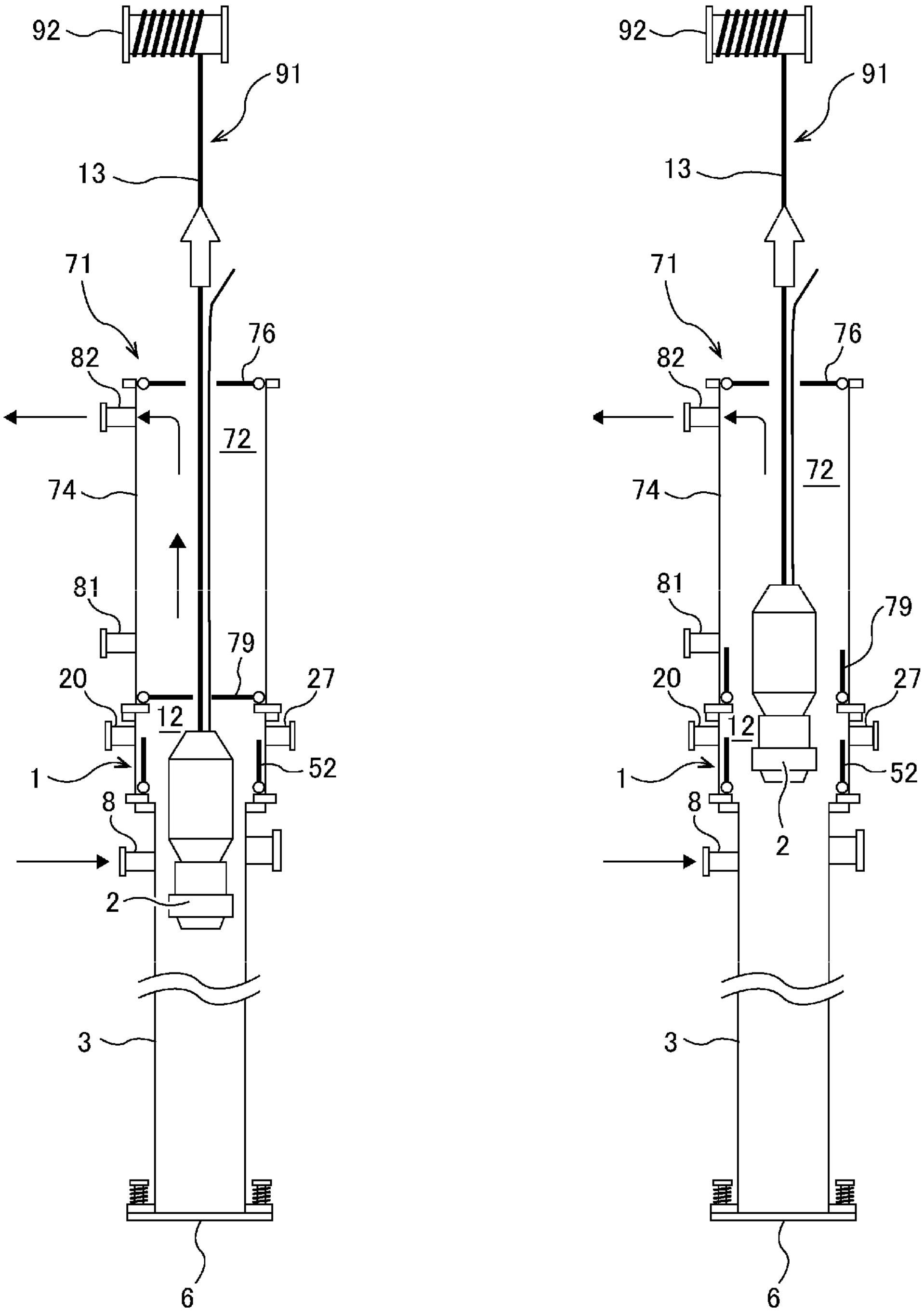
FIG. 22 is a diagram illustrating an operation of pulling up the submersible pump from the pump column.
Figure 23:
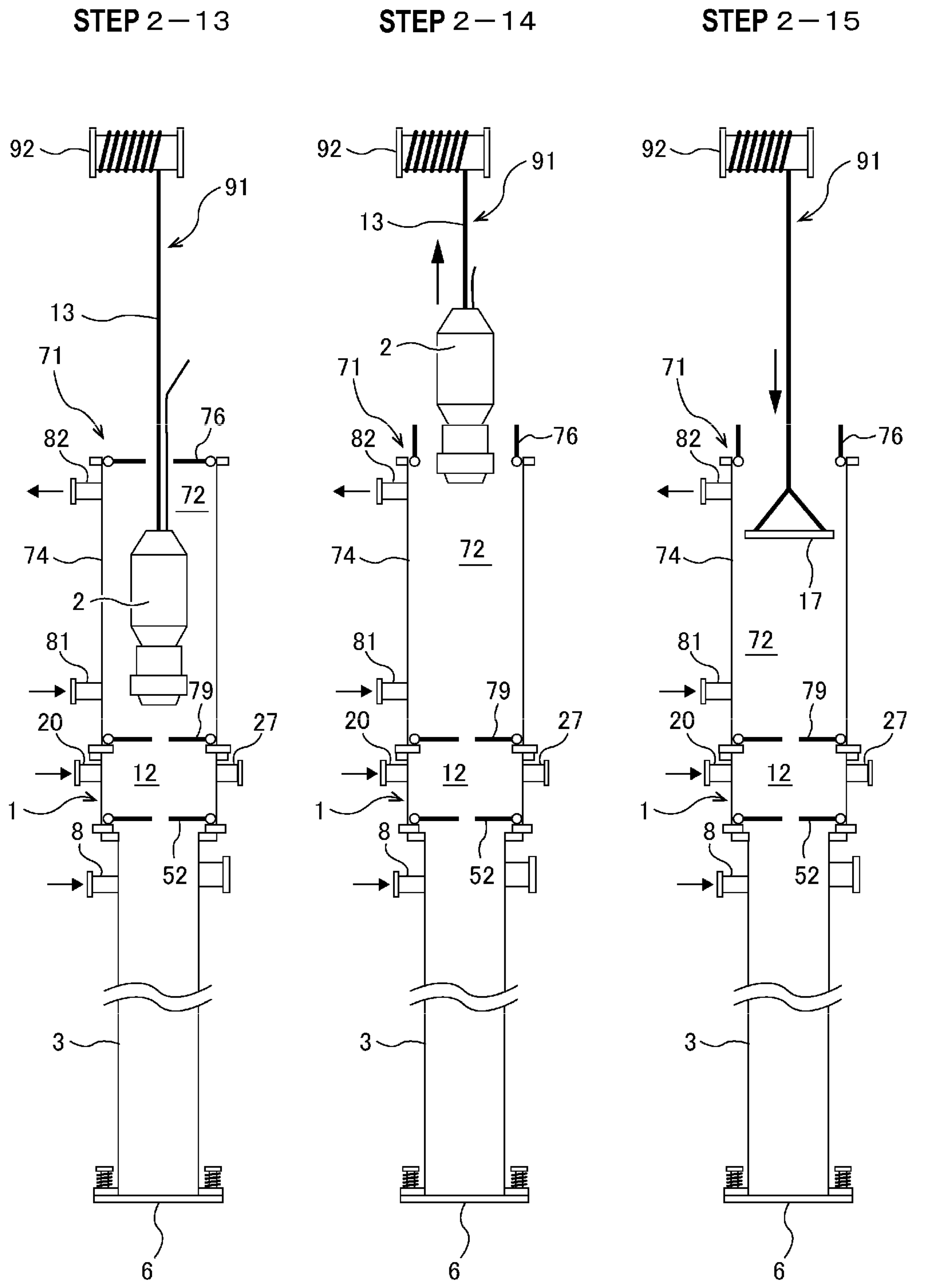
FIG. 23 is a diagram illustrating an operation of pulling up the submersible pump from the pump column.
Figure 24:
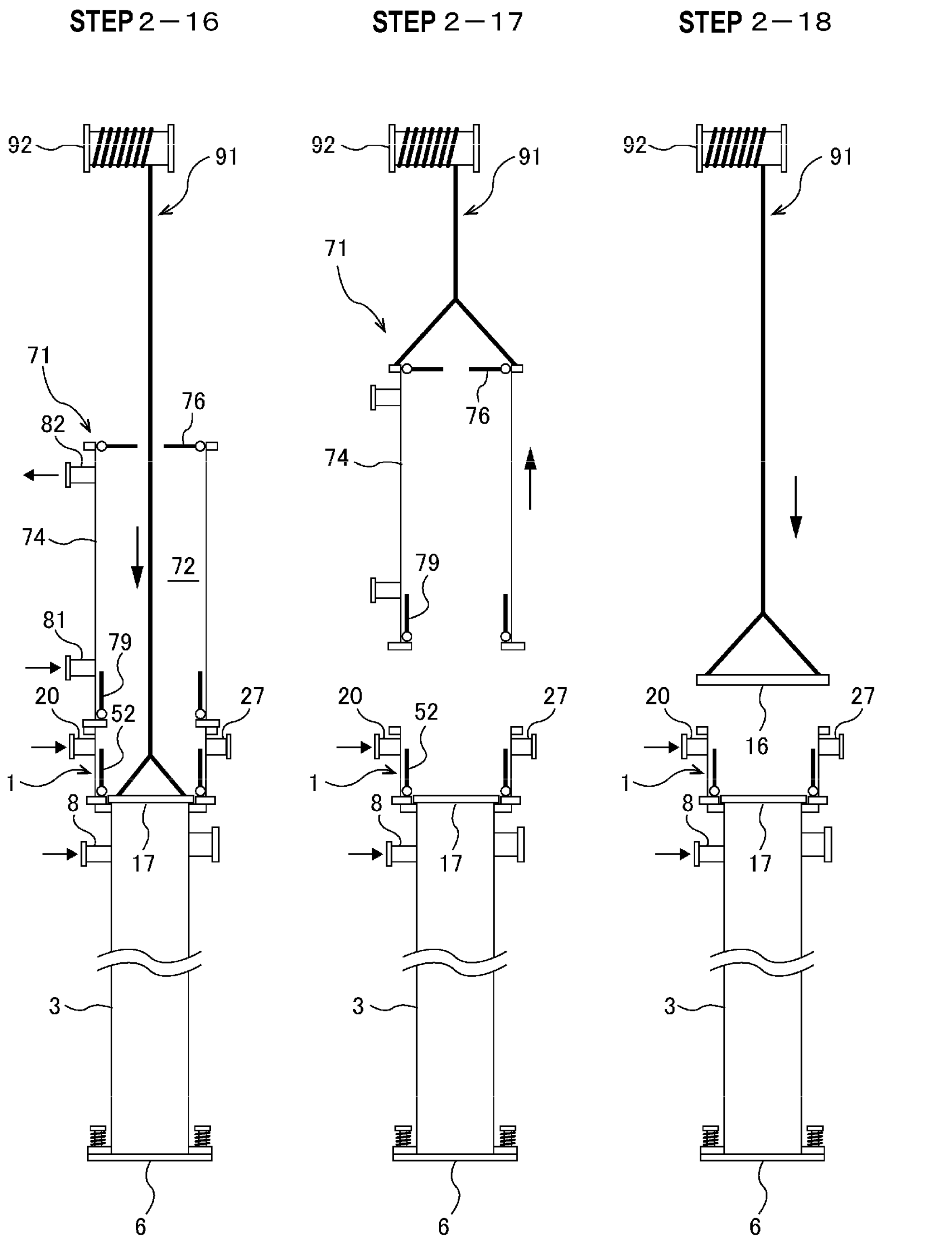
FIG. 24 is a diagram illustrating an operation of pulling up the submersible pump from the pump column.
Figure 25:
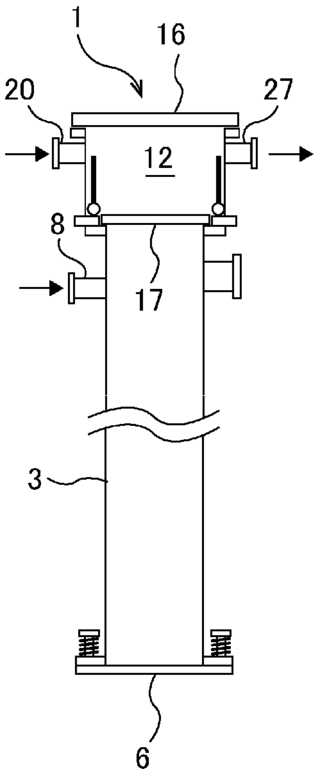
FIG. 25 is a diagram illustrating an operation of pulling up the submersible pump from the pump column.
Figure 28:
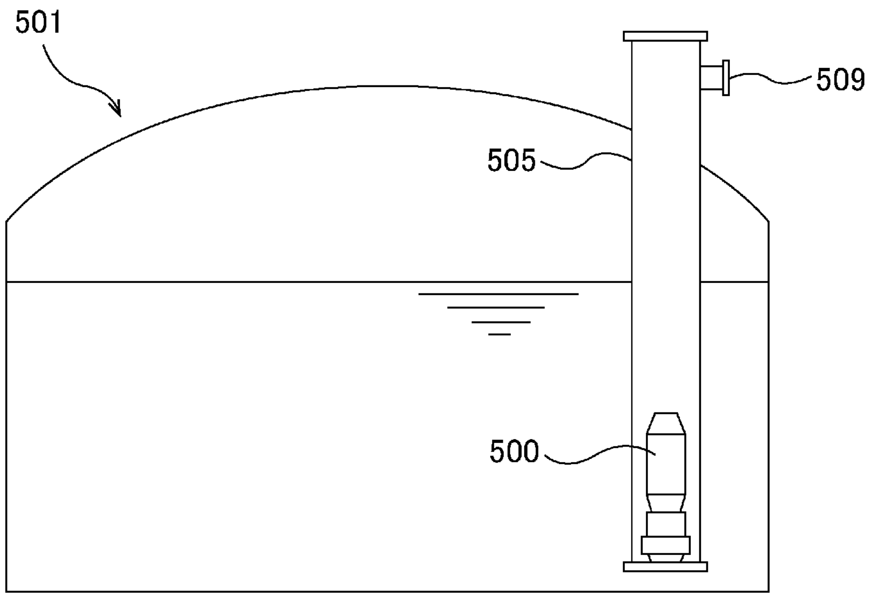
FIG. 28 is a schematic diagram showing a conventional example of a liquefied-gas storage tank in which liquefied gas is stored and a pump for pumping up the liquefied gas.

In one embodiment, in the step 2-12*a* and the step 2-12*b*, the purge gas may be supplied to the pump column 3 only from the purge-gas introduction port 8, and may be discharged from the purge-gas outlet port 82 of the purge container 71 as shown in alternative step 2-12*a*' and alternative step 2-12*b*' of FIG. 22. The purge gas is not supplied to the purge-gas inlet port 81 and the purge-gas inlet port 20. The purge gas flows from the pump column 3 to the interior space 72 of the purge container 71 via the buffer chamber 12 of the buffer gate 1, and is then discharged from the interior space 72 of the purge container 71 through the purge-gas outlet port 82. The purge-gas outlet port 82 may be coupled to a vacuum source to suck the purge gas from the purge container 71. Purge-gas supplying operation of the embodiment shown in FIG. 22, which will not be particularly described, is the same as the purge-gas supplying operation of the embodiment shown in FIG. 17, and duplicated descriptions will be omitted.

In step 2-13, after the submersible pump 2 is moved into the interior space 72 of the purge container 71, the gate valve 79 and the gate valve 52 are closed. The upper lid 76 remains closed. The purge gas is continuously supplied into the interior space 72 of the purge container 71 from the purge-gas inlet port 81. The purge gas is discharged from the interior space 72 of the purge container 71 through the purge-gas outlet port 82. The submersible pump 2 is exposed to (contacts) the purge gas in the purge container 71. The purge gas to be supplied into the purge container 71 may be at room temperature or may be heated in advance by a heating device, such as a heater. The purge gas that fills the interior space 72 of the purge container 71 warms the submersible pump 2 (the hot-up operation). According to this embodiment, the ultra-low temperature submersible pump 2 can be warmed with the purge gas.

This hot-up operation is performed before the submersible pump 2 contacts the ambient air, so that moisture in the air is not liquefied or solidified on the surfaces of the submersible pump 2. In particular, this embodiment is effective when the liquefied gas is liquid hydrogen. Specifically, the submersible pump 2 that has been immersed in liquid hydrogen has an ultra-low temperature equivalent to that of the liquid hydrogen when the submersible pump 2 is pulled out of the pump column 3. The boiling point of hydrogen (−253° C.) is lower than the boiling point of oxygen (−183° C.) and the boiling point of nitrogen (−196° C.). Therefore, when the air comes into contact with the submersible pump 2 immediately after the submersible pump 2 is pulled up from the pump column 3, not only nitrogen in the air but also oxygen is liquefied and may drop into the pump column 3. In this regard, according to the present embodiment, the submersible pump 2 that has been immersed in the liquid hydrogen is quickly warmed by the purge gas before the submersible pump 2 contacts the air. Therefore, when the air comes into contact with the submersible pump 2, the oxygen and the nitrogen in the air are not liquefied, and the liquefied oxygen and the liquefied nitrogen do not drop into the pump column 3. Further, even if a part of the oxygen or a part of the nitrogen in the air is liquefied, the buffer gate 1 can prevent the liquefied oxygen or the liquefied nitrogen from dropping into the pump column 3. As a result, safe removal of the submersible pump 2 can be achieved.

After the hot-up operation for the submersible pump 2 is terminated, the upper lid 76 is opened, and the submersible pump 2 is pulled up out of the purge container 71 by the elevating device 91 in step 2-14. The gate valve 79 and the gate valve 52 remain closed.

In step 2-15, the partition wall 17 is lowered within the purge container 71 and the buffer gate 1 by the elevating device 91. In this step 2-15, at least one of the upper lid 76, the gate valve 79, and the gate valve 52 is closed. More specifically, the partition wall 17 is carried into the purge container 71 with the gate valve 79 and the gate valve 52 closed and the upper lid 76 opened. The upper lid 76 is then closed, the gate valve 79 and the gate valve 52 are opened, and the partition wall 17 is carried into the buffer gate 1.

In step 2-16, the partition wall 17 is placed on the upper end of the pump column 3. The partition wall 17 is fixed to the upper end of the pump column 3 by a fastening mechanism (e.g., screws), so that the upper opening of the pump column 3 is closed by the partition wall 17.

In step 2-17, the purge container 71 is separated from the buffer gate 1, and the purge container 71 is hoisted by the elevating device 91.

In step 2-18, the partition wall 16 is placed on the upper end of the buffer gate 1 by the elevating device 91.

In step 2-19, the partition wall 16 is fixed to the buffer gate 1 by a fastening mechanism (e.g., screws).

In the alternative steps shown in FIGS. 8, 10, 13, 17, 20, and 22, the purge gas is supplied into the pump column 3 only from the purge-gas inlet port 8 and is discharged from the purge-gas outlet port 82 of the purge container 71. Therefore, the purge gas flows through the pump column 3, the buffer chamber 12 of the buffer gate 1, and the interior space 72 of the purge container 71 in this order. Experiments have shown that such supply of the purge gas is capable of replacing the air in the purge container 71 with the purge gas with a smaller flow rate of the purge gas, and is capable of preventing the air from entering the purge container 71.

Figure 12:
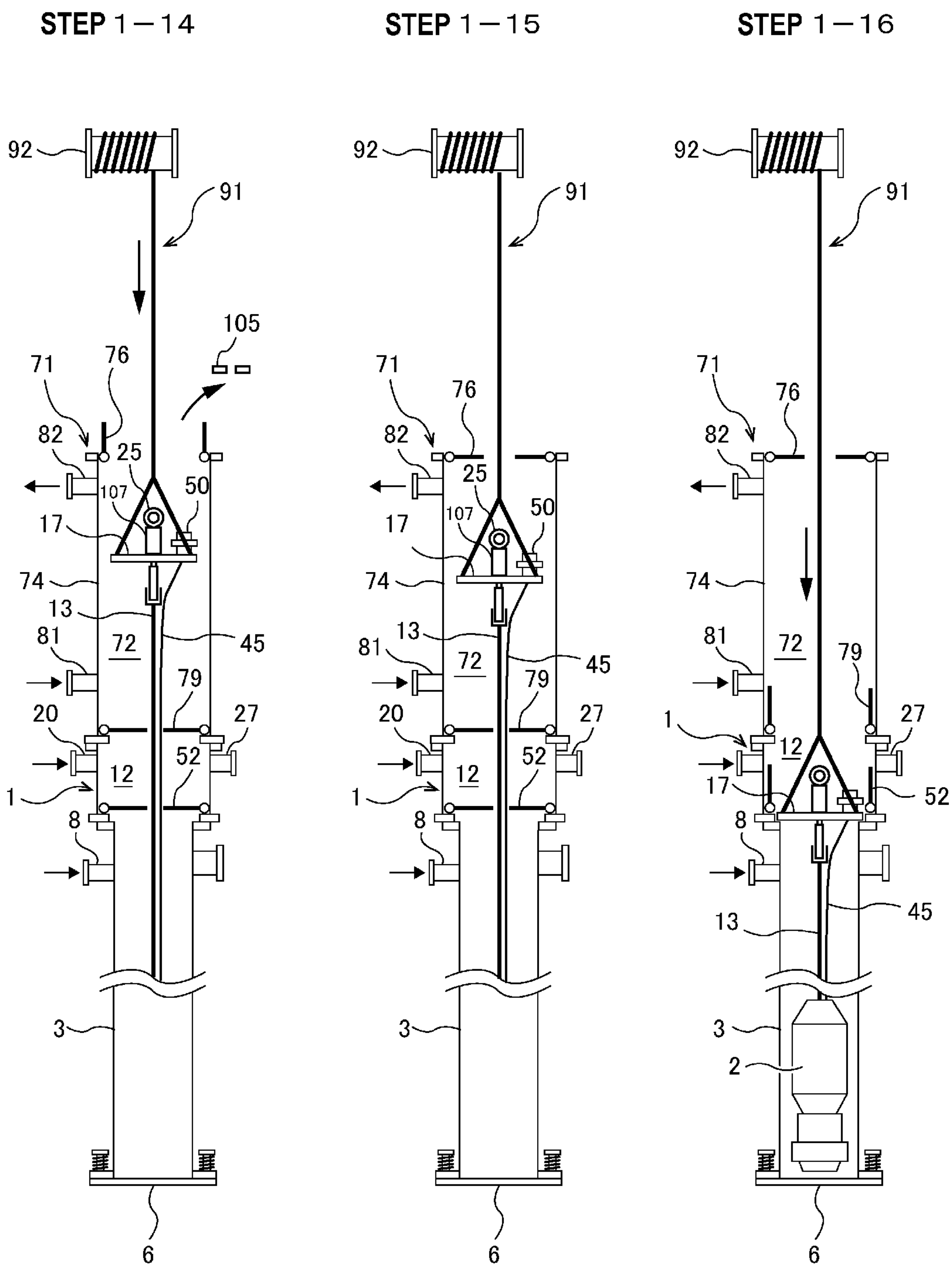
FIG. 12 is a diagram illustrating an operation of carrying a submersible pump into the pump column.

On the other hand, experiments have shown that the drying-up operations shown in the step 1-9 and the step 1-15 are promoted by supplying the purge gas into the purge container 71 through the purge-gas inlet port 81 as shown in FIGS. 7 and 12.

These experiments have been conducted using a small mock-up testing machine. The testing machine has been a structure partitioned two vertically-aligned chambers with a plate having a hole imitated the cable pass-through portion. With the two chambers filled with purge gas, the purge gas has been supplied to the upper and lower chambers for a certain period of time. Then, rise in oxygen concentration in the upper chamber is measured when air entered the upper chamber from the outside.

FIG. 26 is a table showing results of the experiments. From the results of the experiments shown in this table, it has been found that when replacing a space where a gas heavier than the purge gas exists, an amount of the purge gas consumed can be suppressed by causing the purge gas to flow from below the space to be replaced.

FIG. 27 is a table showing results of relative evaluation on supply position of the purge gas, replacement speed of the purge gas, an amount of the purge gas consumed, operability of the supply valve, efficiency of the drying-up operation, and operational safety (e.g., intrusion prevention of the air, internal fluid turbulence, etc.) in each step of the embodiment described above.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments. Therefore, the present invention is not intended to be limited to the embodiments described herein but is to be accorded the widest scope as defined by limitation of the claims.

INDUSTRIAL APPLICABILITY

The present invention is applicable to a buffer gate for use in isolating inside and outside of a pump column when a submersible pump for pressurizing liquefied gas, such as liquefied ammonia, liquefied natural gas (LNG), or liquid hydrogen, is carried into the pump column and when the submersible pump is pulled up from the pump column. Further, the present invention is applicable to a method of carrying the submersible pump into the pump column and a method of pulling up the submersible pump from the pump column using such a buffer gate.

REFERENCE SIGNS LIST

1 buffer gate
2 submersible pump
3 pump column
5 liquefied-gas storage tank
6 suction valve
9 discharge port
12 buffer chamber
13 suspension cable
14 buffer box
16, 17 partition wall
20 purge-gas inlet port
25 movable rod
27 purge-gas outlet port
28 purge-gas supply line
40 purge-gas supply source
42 gas treatment device
43 purge-gas discharge line
45 power cable
46 external power cable
50 electrical terminal
52 gate valve
55 pressure regulating valve
58 purge-gas supply line
59 pressure regulating valve
65 leak detector
71 purge container
72 interior space
74 container body
76 upper lid
79 gate valve
81 purge-gas inlet port
82 purge-gas outlet port
85 purge-gas supply line
86 pressure regulating valve
87 side lid
95 pump cover
97 pump vacuum line
98 pump purge line
101 vacuum valve
102 pump purge valve
105 cable stopper
107 rod stopper

What is claimed is:

1. A buffer gate for isolating inside and outside of a pump column in which a submersible pump is disposed, the submersible pump being for delivering liquefied gas, said buffer gate comprising:
- a buffer box having a buffer chamber therein, the buffer box being fixed to an upper end of the pump column, a width of the buffer chamber being larger than a width of the submersible pump;
- a first partition wall removably fixed to the buffer box and configured to close an upper opening of the buffer box;
- a second partition wall configured to close an upper opening of the pump column, the second partition wall being removable from the buffer box through the buffer chamber and the upper opening of the buffer box;
- a gate valve arranged in the buffer chamber; and
- a purge-gas inlet port communicating with the buffer chamber.

2. The buffer gate according to claim 1, wherein a vertical length of the buffer chamber is smaller than a vertical length of the submersible pump.

3. The buffer gate according to claim 1 or 2, further comprising a leak detector configured to detect liquefied gas leaked from the pump column into the buffer chamber.

4. The buffer gate according to claim 1, further comprising a purge-gas outlet port communicating with the buffer chamber, the purge-gas outlet port being coupled to a gas treatment device.

5. The buffer gate according to claim 1, further comprising an electrical terminal coupled to a power cable for supplying electric power to the submersible pump.

6. A method of carrying a submersible pump into a pump column, the submersible pump being for delivering liquefied gas, said method comprising:
- moving the submersible pump into a purge container with an upper lid of the purge container opened, the purge container being disposed on a buffer gate;
- filling an interior space of the purge container accommodating the submersible pump with purge gas with an upper opening of the pump column closed by a first gate valve, an upper opening of the purge container closed by the upper lid, and a lower opening of the purge container closed by a second gate valve; and
- moving the submersible pump from the purge container into the pump column via the buffer gate with the upper lid closed, and the first gate valve and the second gate valve opened.

7. The method according to claim 6, wherein while the submersible pump is moved from the purge container into the pump column via the buffer gate, purge gas is continuously supplied into the purge container, a buffer chamber of the buffer gate, and the pump column.

8. The method according to claim 7, wherein a pressure of the purge gas supplied into the buffer chamber is higher than a pressure of the purge gas supplied into the purge container.

9. The method according to claim 7, wherein a pressure of the purge gas supplied into the pump column is higher than a pressure of the purge gas supplied into the buffer chamber.

10. The method according to claim 6, wherein while the submersible pump is moved from the purge container into the pump column via the buffer gate, purge gas is supplied into the purge container, a buffer chamber of the buffer gate, and the pump column in an order of the purge container, the buffer chamber, and the pump column.

11. The method according to claim 6, wherein while the submersible pump is moved from the purge container into the pump column via the buffer gate, the purge gas is supplied into the pump column to cause flow of the purge gas from the pump column into an interior space of the purge container via a buffer chamber of the buffer gate.

12. The method according to claim 6, further comprising supplying purge gas to an interior of the submersible pump before moving the submersible pump into the purge container or after moving the submersible pump into the purge container.

13. The method according to claim 6, further comprising lowering the submersible pump within the pump column with the upper lid, the first gate valve, and the second gate valve closed after moving the submersible pump from the purge container into the pump column via the buffer gate.

14. The method according to claim 6, wherein the liquefied gas comprises liquid hydrogen, and the purge gas includes at least helium gas.

15. The method according to claim 6, wherein the liquefied gas comprises liquid hydrogen, and the purge gas includes hydrogen gas.

16. The method according to claim 6, wherein the liquefied gas comprises liquefied ammonia, and the purge gas includes ammonia gas.

17. A method of pulling up a submersible pump from a pump column, the submersible pump being for delivering liquefied gas, said method comprising:

- moving the submersible pump from the pump column into a purge container via a buffer gate with an upper opening of the purge container closed by an upper lid, the purge container being disposed on the buffer gate;
- filling an interior of the purge container accommodating the submersible pump with purge gas with an upper opening of the pump column closed by a first gate valve, the upper opening of the purge container closed by the upper lid, and a lower opening of the purge container closed by a second gate valve; and
- pulling up the submersible pump from the purge container with the upper lid opened, and the first gate valve and the second gate valve closed.

18. The method according to claim 17, wherein while the submersible pump is moved from the pump column into the purge container via the buffer gate, purge gas is continuously supplied into the purge container, a buffer chamber of the buffer gate, and the pump column.

19. The method according to claim 18, wherein a pressure of the purge gas supplied into the buffer chamber is higher than a pressure of the purge gas supplied into the purge container.

20. The method according to claim 18, wherein a pressure of the purge gas supplied into the pump column is higher than a pressure of the purge gas supplied into the buffer chamber.

21. The method according to claim 17, wherein while the submersible pump is moved from the pump column into the purge container via the buffer gate, purge gas is supplied into the pump column, a buffer chamber of the buffer gate, and the purge container in an order of the pump column, the buffer chamber, and the purge container.

22. The method according to claim 17, wherein while the submersible pump is moved from the pump column into the purge container via the buffer gate, the purge gas is supplied into the pump column to cause flow of the purge gas from the pump column into an interior space of the purge container via a buffer chamber of the buffer gate.

23. The method according to claim 17, further comprising elevating the submersible pump within the pump column with the upper lid, the first gate valve, and the second gate valve closed before moving the submersible pump from the pump column into the purge container via the buffer gate.

24. The method according to claim 17, wherein the liquefied gas comprises liquid hydrogen, and the purge gas includes at least helium gas.

25. The method according to claim 17, wherein the liquefied gas comprises liquid hydrogen, and the purge gas includes hydrogen gas.

26. The method according to claim 17, wherein the liquefied gas comprises liquefied ammonia, and the purge gas includes ammonia gas.

* * * * *